(12) United States Patent
Yonezawa

(10) Patent No.: US 10,623,895 B2
(45) Date of Patent: Apr. 14, 2020

(54) POSITION DETECTION APPARATUS FOR DETECTING POSITION OF FIRST MEMBER RELATIVE TO SECOND MEMBER, AND LENS APPARATUS, IMAGE PICKUP APPARATUS, AND LENS COMMAND APPARATUS EACH INCLUDING THE POSITION DETECTION APPARATUS

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 15/848,805

(22) Filed: Dec. 20, 2017

(65) Prior Publication Data

US 2018/0115870 A1 Apr. 26, 2018

Related U.S. Application Data

(62) Division of application No. 14/932,102, filed on Nov. 4, 2015, now abandoned.

(30) Foreign Application Priority Data

Nov. 11, 2014 (JP) .................................. 2014-228844

(51) Int. Cl.
*G02B 7/09* (2006.01)
*H04W 4/02* (2018.01)

(52) U.S. Cl.
CPC ........... *H04W 4/023* (2013.01); *H04W 4/027* (2013.01)

(58) Field of Classification Search
CPC ....... G02B 27/646; G02B 7/09; H04W 4/023; H04W 4/027

(Continued)

(56) References Cited

U.S. PATENT DOCUMENTS 7,663,093 B2 2/2010 Kusano
8,993,955 B2 3/2015 Nakamura et al.
(Continued)

FOREIGN PATENT DOCUMENTS

JP   H08178693 A   7/1996
JP   2005345375 A  12/2005
(Continued)

OTHER PUBLICATIONS

Office Action issued in Japanese Appln. No. 2018-151771 dated Jun. 18, 2019.
(Continued)

*Primary Examiner* — Que Tan Le
(74) *Attorney, Agent, or Firm* — Rossi, Kimms & McDowell LLP

(57) ABSTRACT

A position detector of a mover relative to a stator includes: an output unit outputting displacement signals including a first signal in a first period and a second signal in a period longer than the first period, while switching among the displacement signals, according to a change in the position of the mover; and a deriver that derives an absolute position as the position of the mover based on the displacement signals, and derives a relative position as a displacement amount with respect to a predetermined absolute position of the mover, wherein in deriving the absolute position, the signal output unit outputs the first signal, the second signals, and the first signal in this order, and the deriver derives the absolute position based on the displacement signals, in deriving the relative position, the position deriver derives the relative position based on the first signal and the second signals.

35 Claims, 20 Drawing Sheets

(58) Field of Classification Search
USPC .......................................... 250/221, 231.13
See application file for complete search history.

(56) References Cited

U.S. PATENT DOCUMENTS

| | | | |
|---|---|---|---|
| 9,200,928 B2 | 12/2015 | Yonezawa | |
| 9,228,857 B2 | 1/2016 | Shigeta | |
| 9,310,226 B2 | 4/2016 | Kato | |
| 9,910,243 B2* | 3/2018 | Kindaichi | G02B 7/16 |

FOREIGN PATENT DOCUMENTS

| | | |
|---|---|---|
| JP | 2007171081 A | 7/2007 |
| JP | 2008032562 A | 2/2008 |
| JP | 2010249720 A | 11/2010 |
| JP | 2013088191 A | 5/2013 |
| JP | 2014126492 A | 7/2014 |
| JP | 2014134493 A | 7/2014 |
| JP | 2014190905 A | 10/2014 |
| JP | 2014206429 A | 10/2014 |

OTHER PUBLICATIONS

Notice of Allowance issued in U.S. Appl. No. 14/932,102 dated Jun. 20, 2017.
Notice of Allowance issued in U.S. Appl. No. 14/932,102 dated Dec. 20, 2017.
Office Action issued in Japanese Appln. No. 2014-228844 dated Nov. 1, 2018.
Office Action issued in Japanese Appln. No. 2014-228844 dated Feb. 1, 2018.
Office Action issued in Japanese Appln. No. 2014-228844 dated Jun. 14, 2018.

* cited by examiner

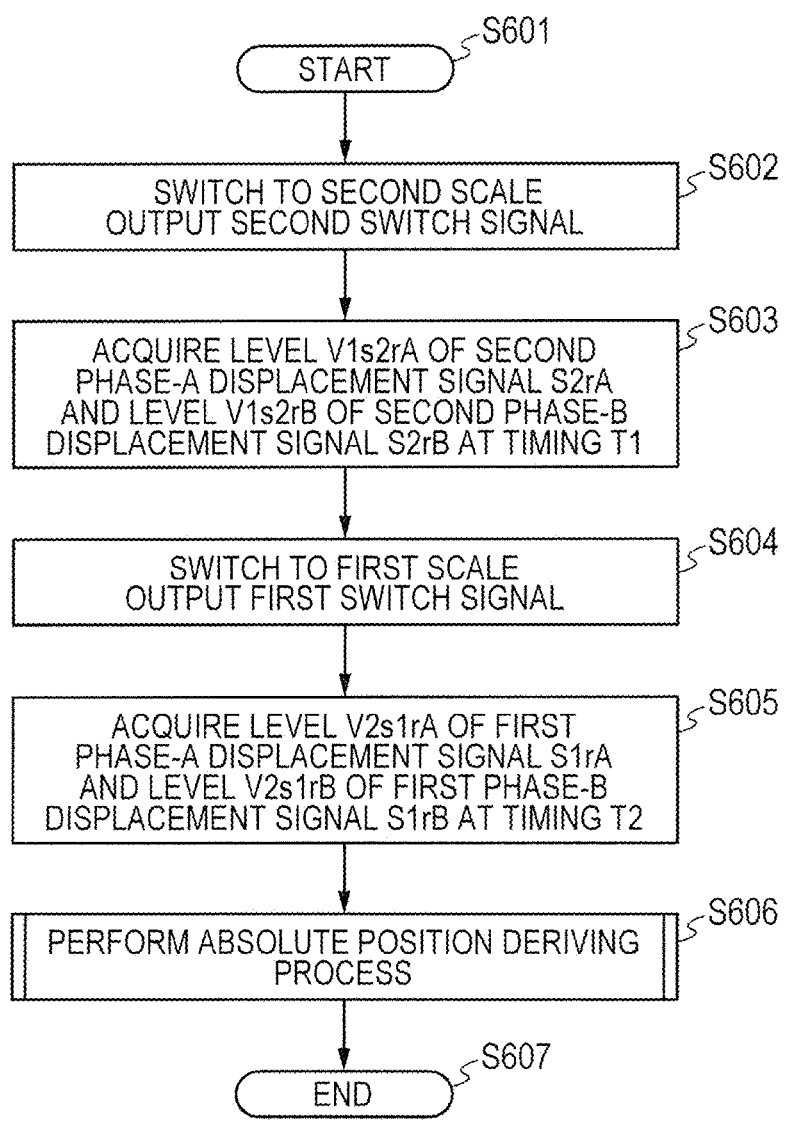

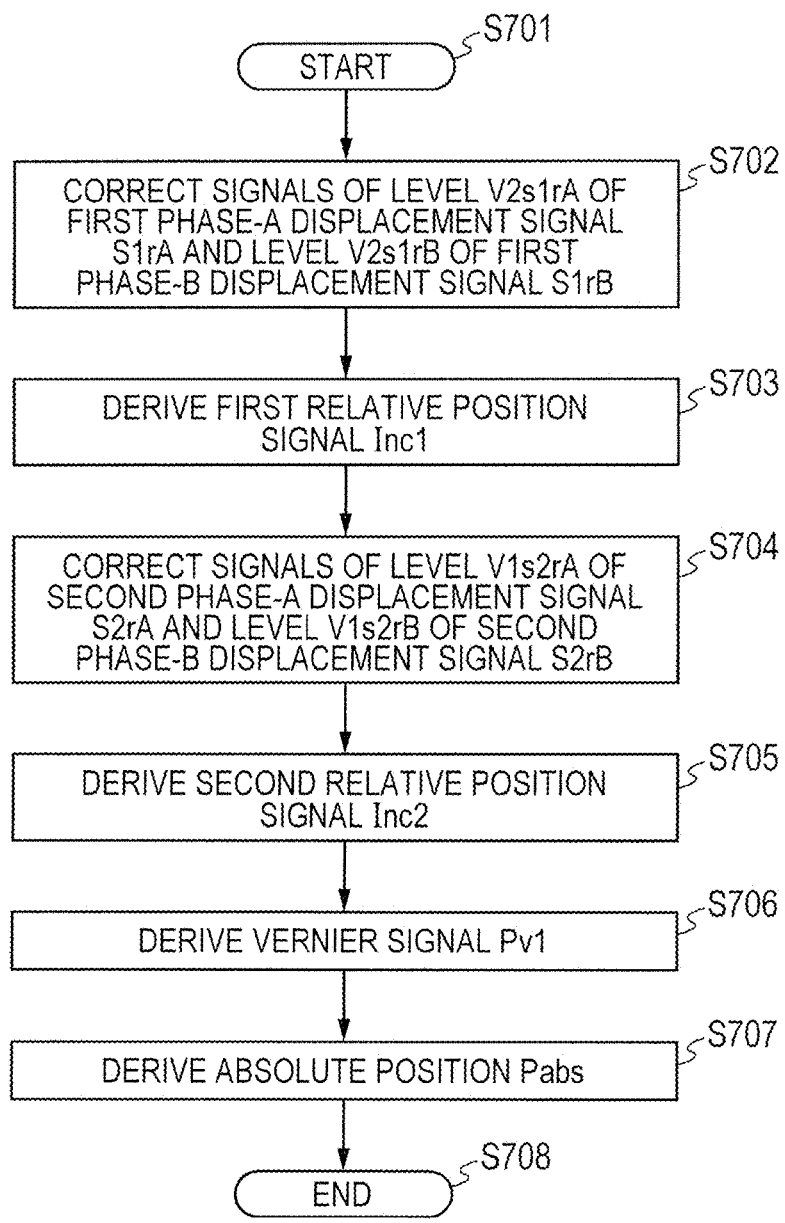

FIG. 8A  Atan1
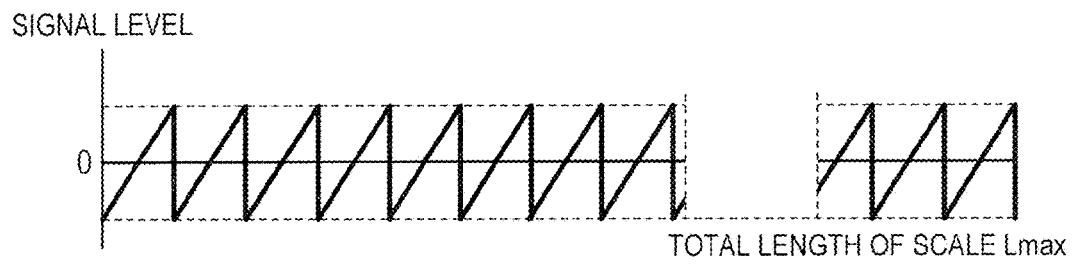
FIG. 8B  Inc1
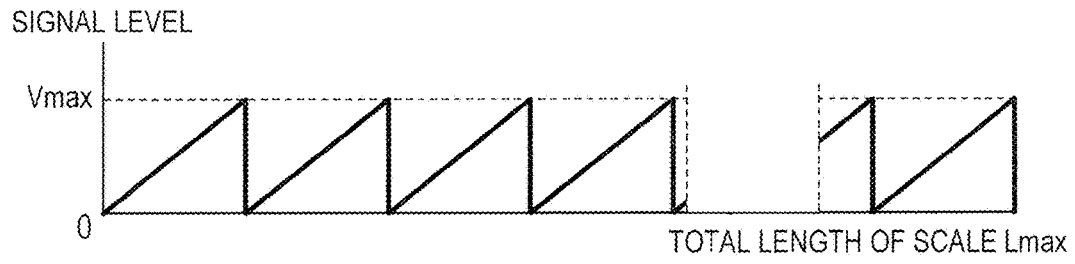
FIG. 8C  Inc2
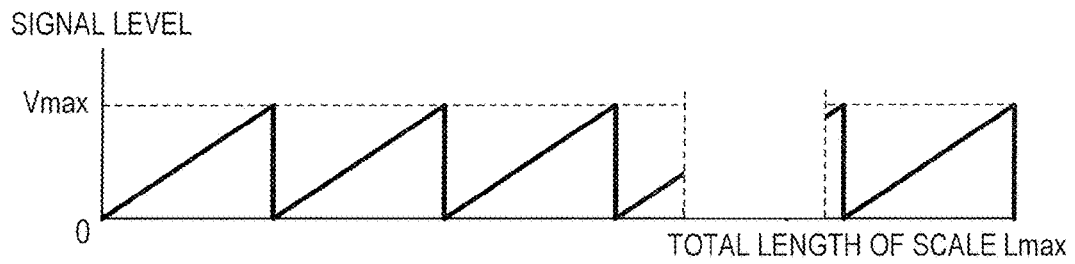
FIG. 8D  Pv1
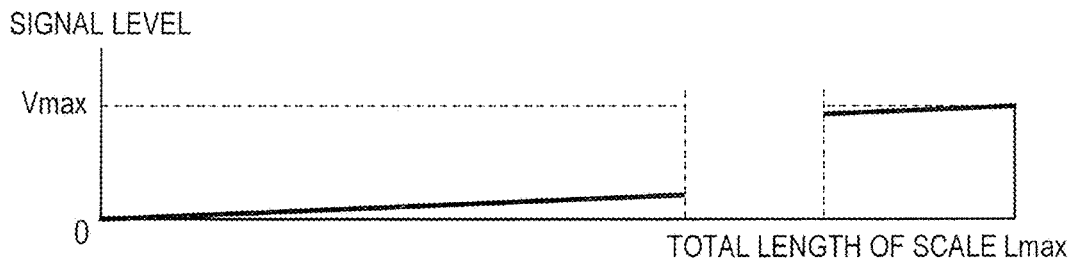

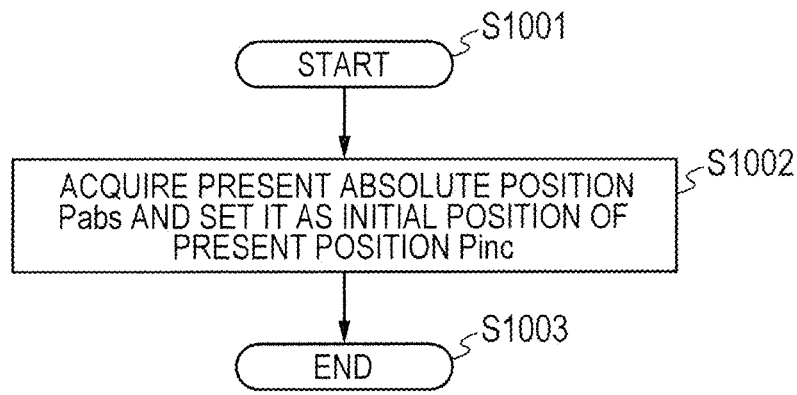
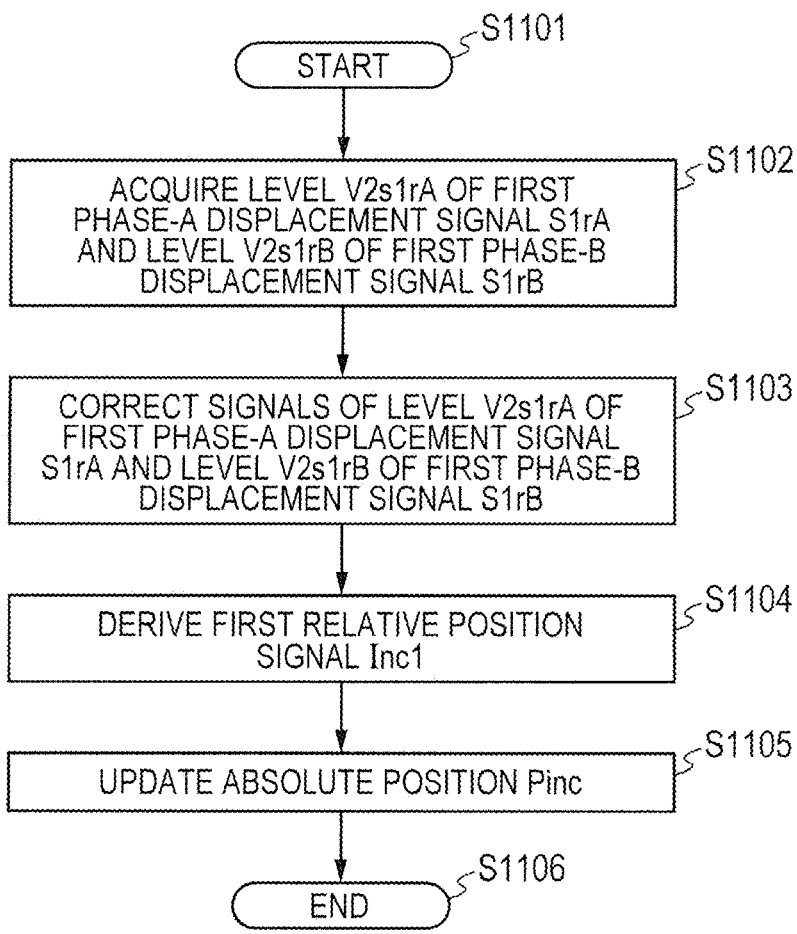

POSITION DETECTION APPARATUS FOR DETECTING POSITION OF FIRST MEMBER RELATIVE TO SECOND MEMBER, AND LENS APPARATUS, IMAGE PICKUP APPARATUS, AND LENS COMMAND APPARATUS EACH INCLUDING THE POSITION DETECTION APPARATUS

BACKGROUND OF THE INVENTION

Field of the Invention

The present invention relates to a position detection apparatus for detecting the position of a movable member, and particularly to a position detection apparatus for detecting the position of a movable member based on a plurality of signals, and a lens apparatus, an image pickup apparatus, and a lens command apparatus each including the position detection apparatus.

Description of the Related Art

An absolute encoder capable of determining an absolute position by measurement as well as an incremental encoder for measuring a relative moving distance is known as an apparatus for measuring a moving distance of an object.

Japanese Patent Application Laid-Open No. 2013-088191 discloses a Vernier type absolute encoder configured to acquire a signal by switching among detection states of a plurality of periodic signals to derive an absolute position. After the absolute position has been derived, a relative position is derived by using only one of the periodic signals with reference to the derived absolute position.

Japanese Patent Application Laid-Open No. 2010-249720 discloses a code-type absolute encoder that compares an absolute position derived by an absolute position generator and a relative position relatively derived from an absolute position reference based on an incremental signal and detects abnormality.

If the absolute encoder having the configuration disclosed in Japanese Patent Application Laid-Open No. 2013-088191 performs abnormality detection as described in Japanese Patent Application Laid-Open No. 2010-249720, there arises the following problem.

In the Vernier type absolute encoder, a relative position is derived by using only one periodic signal, whereas an absolute position is derived by using a plurality of periodic signals. However, the configuration disclosed in Japanese Patent Application Laid-Open No. 2013-088191 needs to switch a signal to be detected in order to acquire a plurality of periodic signals, and thus, a periodic signal for deriving a relative position cannot be acquired while the signal is being switched. Specifically, the relative position deriving process needs to be stopped while a plurality of periodic signals are being acquired in order to derive an absolute position, and thus, a relative position deriving unit cannot detect a positional change while the relative position deriving process is stopped. That is, the absolute position and the relative position cannot be derived at the same time.

SUMMARY OF THE INVENTION

A position detection apparatus according to the present invention is a position detection apparatus for detecting a position of a movable member relative to a fixed member and includes: a signal output unit that outputs a plurality of displacement signals including a first signal that changes in a first period and a second signal that changes in a period longer than the first period, while switching among the plurality of displacement signals, in accordance with a change in the position of the movable member relative to the fixed member; and a position deriver that derives an absolute position as the position of the movable member relative to the fixed member based on the plurality of displacement signals output from the signal output unit, and derives a relative position as a displacement amount with respect to a predetermined absolute position of the movable member relative to the fixed member, wherein in deriving the absolute position, the signal output unit outputs the first signal, a plurality of the second signals, and the first signal in this order, and the position deriver derives the absolute position based on the plurality of displacement signals in deriving the relative position, the position deriver derives the relative position based on the first signal and the plurality of the second signals.

According to the present invention, in the position detection apparatus, a highly reliable position detection unit that can achieve size reduction of a circuit configuration and can detect an absolute position and a relative position at the same time accurately can be provided.

Further features of the present invention will become apparent from the following description of exemplary embodiments with reference to the attached drawings.

BRIEF DESCRIPTION OF THE DRAWINGS

FIG. 6 is a flowchart showing signal acquisition for acquiring an initial position.

FIG. 7 is a flowchart showing deriving of an absolute position for acquiring the initial position.

FIG. 8A is a graph showing a signal Atan1.

FIG. 8B is a graph showing a first relative position signal.

FIG. 8C is a graph showing a second relative position signal.

FIG. 8D is a graph showing a Vernier signal.

FIG. 10 is a flowchart showing an initialization operation for deriving a relative position.

FIG. 11 is a flowchart showing deriving of the relative position.

DESCRIPTION OF THE EMBODIMENTS

Preferred embodiments of the present invention will now be described in detail in accordance with the accompanying drawings.

First Embodiment

With reference to FIGS. 1 to 16B, a position detection unit according to a first embodiment of the present invention will be described.

Figure 1:
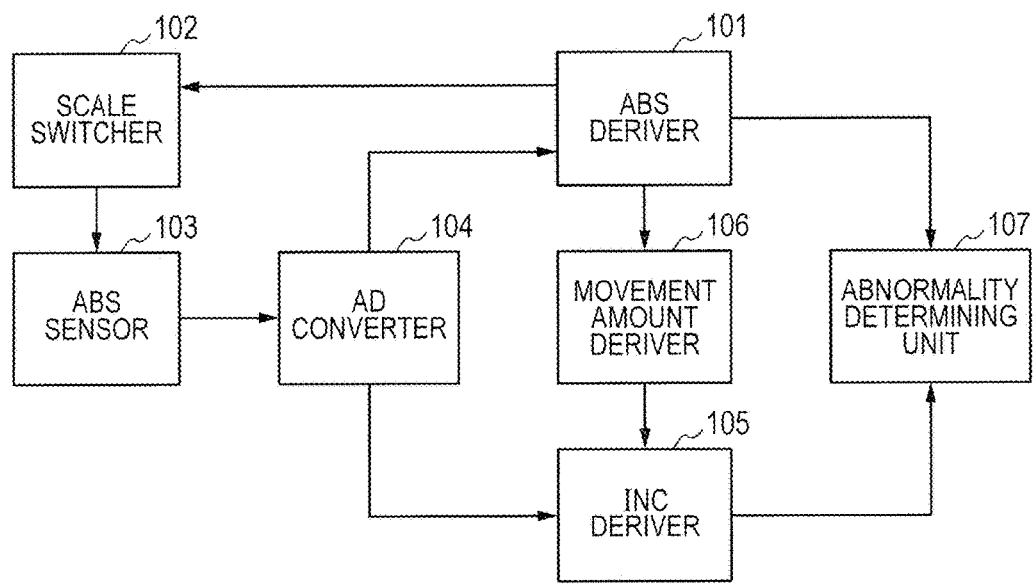
FIG. 1 is a block diagram illustrating a configuration according to a first embodiment.

FIG. 1 is a block diagram illustrating a configuration of the position detection unit according to the first embodiment of the present invention. In FIG. 1, an ABS deriver 101 is an arithmetic section for deriving an absolute position Pabs that is a displacement amount (relative to a predetermined reference position) of a movable member relative to a fixed member, based on a signal output from the ABS sensor 103. A scale switcher (switcher) 102 is a scale switcher that switches between two types of signal outputs generated based on two types of track patterns sequentially output from the ABS sensor 103. An ABS sensor (signal detection unit) 103 is an absolute position sensor that outputs a signal for deriving an absolute position of the movable member relative to the fixed member. An inner configuration and an output signal of the ABS sensor 103 will be described later. An AD converter 104 is an AD converter that converts an analog signal output from the ABS sensor 103 to a digital signal. An INC deriver 105 is an arithmetic section that derives a relative position Pinc based on a displacement amount from a reference position.

The movement amount deriver 106 is a movement amount deriver that derives and corrects a movement amount in which the movable member moves while the movement amount deriver 106 acquires the two types of signals acquired by the ABS deriver 101. The movement amount correcting process will be specifically described.

The abnormality determining unit 107 is a determination unit that determines whether the position detection unit has abnormality or not, based on Pabs as an arithmetic result in the ABS deriver 101 and Pinc as an arithmetic result in the INC deriver 105.

The ABS deriver 101, the INC deriver 105, the movement amount deriver 106, and the abnormality determining unit 107 are provided in, for example, one CPU.

Then, an inner configuration and an output signal of the ABS sensor 103 will be described.

Figure 2:
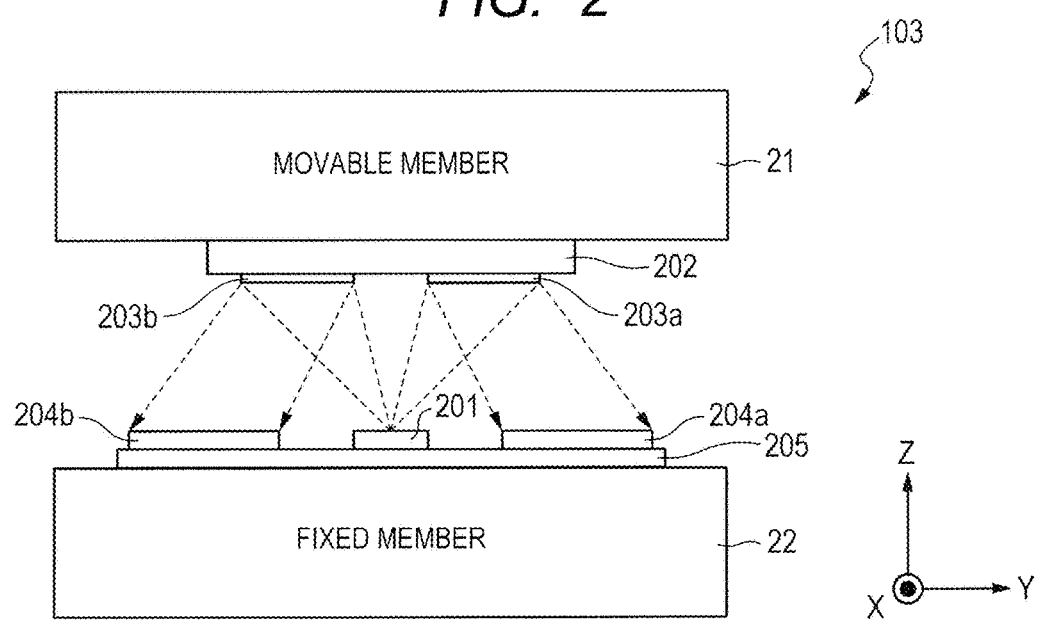
FIG. 2 is a cross-sectional view of an ABS sensor.

FIG. 2 is a cross-sectional view of the ABS sensor 103. In FIG. 2, the movable member 21 is a movable unit that moves in an X-axis direction that is perpendicular to the drawing sheet, relative to the fixed member 22. A light source 201 is a light-emitting unit, and is, for example, an LED. A scale unit 202 is a scale unit including two evenly spaced track patterns 203a and 203b having different numbers of slits in the entire length thereof. Each of light receivers 204a and 204b is a light receiver that receives light emitted from the light source 201 and reflected on an associated one of the track patterns 203a and 203b, and is composed of, for example, a photodiode array. A signal processing circuit 205 is a signal processing circuit that performs processing on signals received by the light receivers 204a and 204b and outputs a signal of one of the track patterns 203a and 203b in accordance with a switch signal of the scale switcher 102.

In this embodiment, the movable member 21 includes the scale unit 202, and the fixed member 22 includes the light source 201 and the light receivers 204a and 204b. However, the present invention is not limited to this example, and the scale unit 202 may be included in one of the fixed member or the movable member with the light source 201 and the light receivers 204a and 204b being included in the other. The same holds for the embodiment below.

Figure 3:
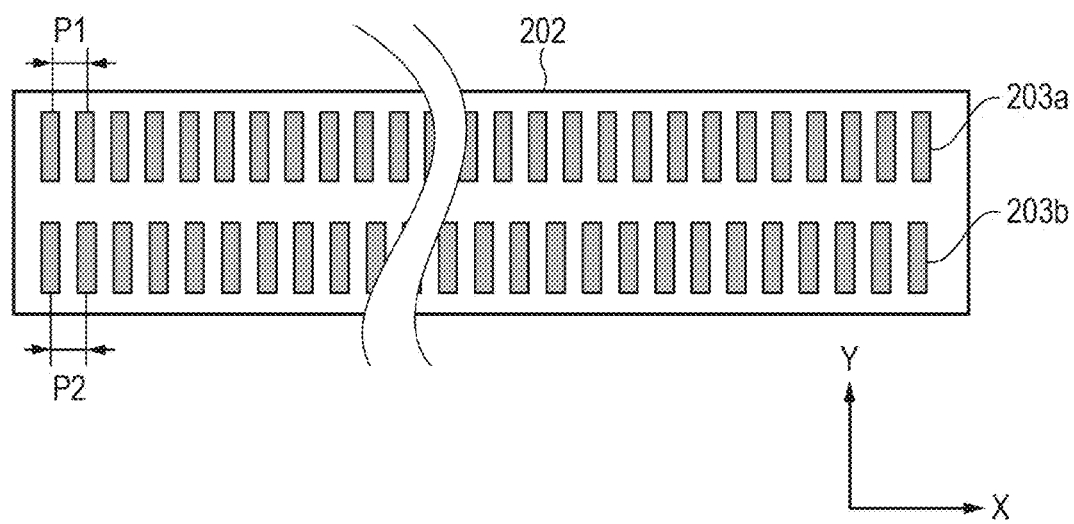
FIG. 3 is a plan view of a scale unit according to the first embodiment.

FIG. 3 is a plan view of the scale unit 202 according to this embodiment. FIG. 3 illustrates a reflection-type slit pattern (reflection pattern array) as an example. The scale unit 202 includes two track patterns, that is, a first track pattern 203a and a second track pattern 203b. When light from the light source 201 strikes reflection portions (black portions in FIG. 3) of the track patterns 203a and 203b, the light is respectively reflected toward the light receivers 204a and 204b. The reflection portions of the first track pattern 203a are formed to be evenly spaced from each other at a pitch P1. The reflection portions of the second track pattern 203b are formed to be evenly spaced from each other at a pitch P2. In this embodiment, P1 is selected in such a way that 40 reflection portions are provided for the total length Lmax of the scale, that is, 40 periods are provided for the total length Lmax. On the other hand, P2 is selected in such a way that 39 reflection portions are provided for the total length Lmax of scale, that is, 39 periods are provided for the total length Lmax.

Figure 4:
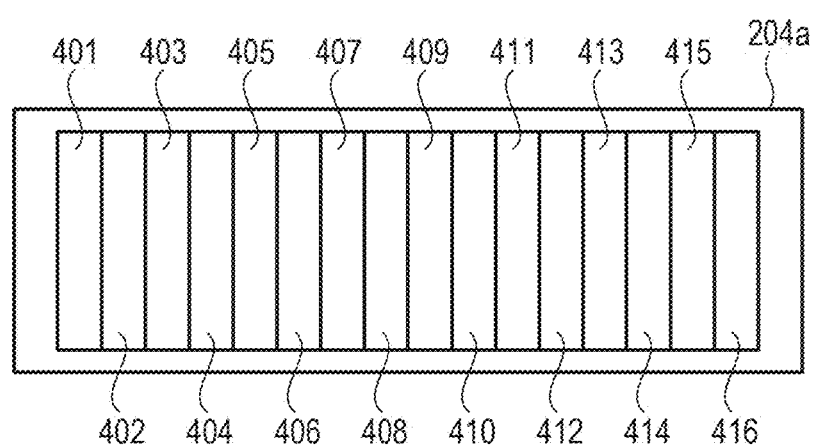
FIG. 4 is a plan view of a light receiver.

FIG. 4 is a plan view of the light receiver 204a. The light receiver 204b has a configuration similar to that of the light receiver 204a. In the light receiver 204a, 16 photodiodes 401 to 416 are arranged at regular intervals in a horizontal direction. The photodiodes 401, 405, 409, and 413 are electrically connected to one another, and will be hereinafter referred to as a phase-a. The group of the photodiodes 402, 406, 410, and 414 will be hereinafter referred to as a phase-b. Similarly, the group of the photodiodes 403, 407, 411, and 415 will be hereinafter referred to as a phase-c, and the group of the photodiodes 404, 408, 412, and 416 will be hereinafter referred to as a phase-d. Description of this embodiment is based on the premise that the pitch of four photodiodes (e.g., the pitch from the photodiode 401 to the photodiode 404) in the light receiver 204a is twice as large as the pitch P1 of the reflection portions of the first track pattern 203a. Here, the distance twice as large as the distance from the light source 201 to the reflection portions of the first track pattern 203a is equal to the distance from the light source 201 to the light receiver 204a. Thus, the width of reflected light received by the light receiver 204a is twice as large as the width of the reflection portions. Accordingly, the pitch of four photodiodes in the light receiver 204a corresponds to one period of the pattern of the first track pattern 203a.

When the light receiver 204a receives light from the light source 201 reflected on the first track pattern 203a, each of the photodiode groups of the phase-a, the phase-b, the phase-c, and the phase-d outputs photocurrent in accordance with the amount of received light. Here, with movement of the scale unit 202 in the X-axis direction, the photodiode groups of the phase-a, the phase-b, the phase-c, and the phase-d output currents (periodic signals) that vary in accordance with a phase relationship in which the phase-b shifts 90°, the phase-c shifts 180°, and the phase-d shifts 270° with respect to the phase-a. The signal processing circuit 205 converts an output current to a voltage with a current-to-voltage converter. Then, the signal processing circuit 205 obtains a differential component between the phase-a and the phase-c and a differential component between the phase-b and the phase-d, with a differential amplifier. Thereafter, the signal processing circuit 205 generates a first phase-A displacement signal S1rA that is a phase-A displacement signal of the first track pattern 203a and a first phase-B displacement signal S1rB that is a phase-B displacement signal of the first track pattern 203a, from the differential component between the phase-a and the phase-c and the differential component between the phase-b and the phase-d. The phases of the phase-A displacement signal and the phase-B displacement signal are shifted from each other by 90°. In a similar manner, the light receiver 204b generates a second phase-A displacement signal S2rA that is a phase-A displacement signal of the second track pattern 203b and a second phase-B displacement signal S2rB that is a phase-B displacement signal of the second track pattern 203b.

Here, the signal processing circuit 205 outputs either the first phase-A displacement signal S1rA and the first phase-B displacement signal S1rB or the second phase-A displacement signal S2rA and the second phase-B displacement signal S2rB, in accordance with the switch signal from the scale switcher 102. In this manner, the signal from the signal processing circuit 205 is output with switching in accordance with the switch signal from the scale switcher 102 so that a processing load of the signal processing circuit 205 is reduced, thereby achieving high-speed processing, power conservation, and size reduction.

In the foregoing manner, the ABS sensor 103 outputs either the first phase-A displacement signal S1rA and the first phase-B displacement signal S1rB or the second phase-A displacement signal S2rA and the second phase-B displacement signal S2rB, in accordance with the switch signal from the scale switcher 102.

Figure 5:
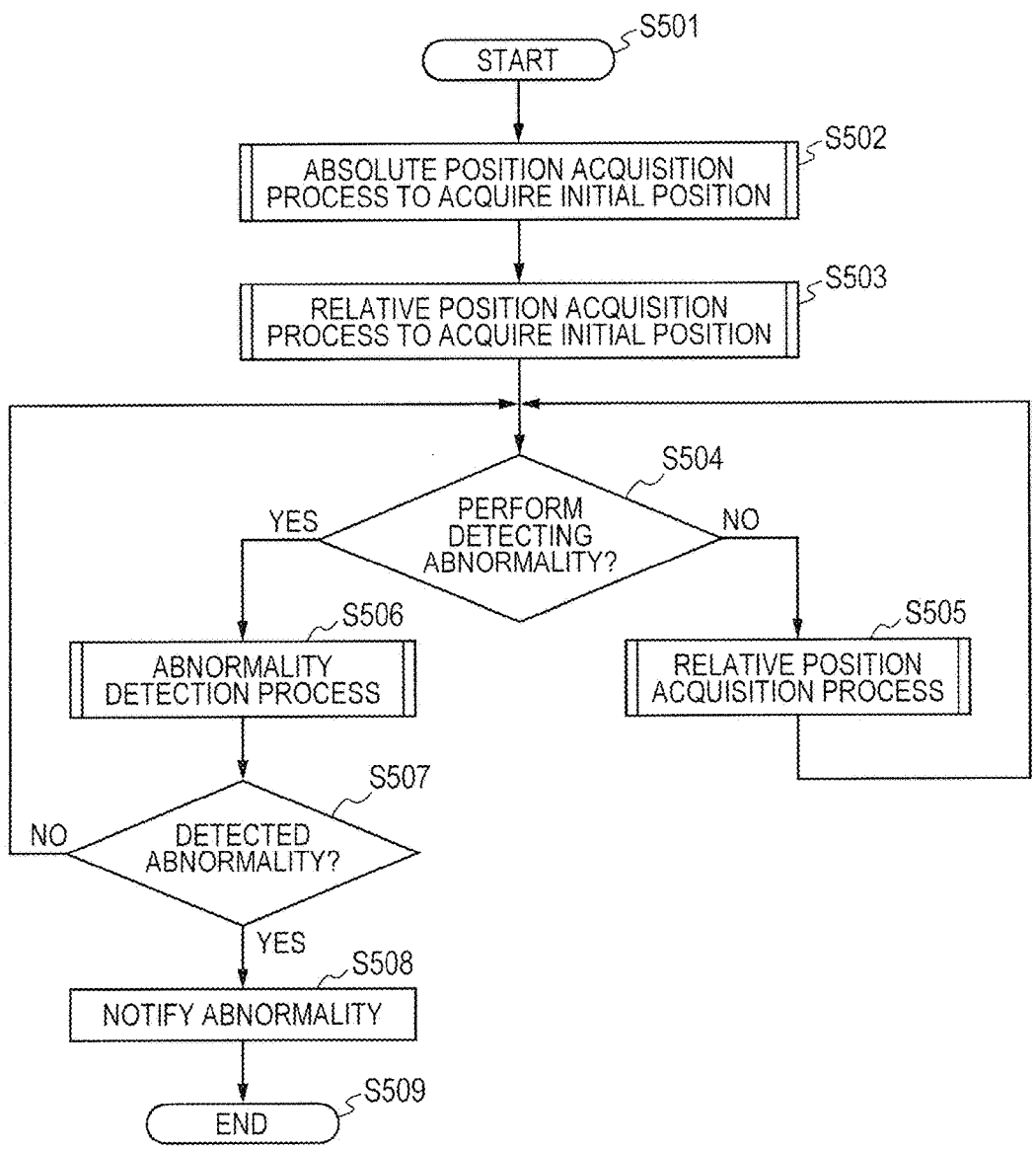
FIG. 5 is a flowchart showing the entire process in the first embodiment.

An operation of this embodiment will be described with reference to FIGS. 5 to 15. FIG. 5 shows an operation flow of this embodiment.

The process starts in S501, and proceeds to S502. The start of the process is, for example, power-on of equipment.

In S502, an absolute position acquisition process for acquiring an initial position is performed, and the process proceeds to S503. The absolute position acquisition process for acquiring the initial position will be described in detail below.

In S503, an initialization process for acquiring a relative position is performed, and the process proceeds to S504. The initialization process for acquiring the relative position will be described in detail below.

In S504, it is determined whether abnormality detection is performed or not. If the abnormality detection is not performed, the process proceeds to S505, and otherwise, the process proceeds to S506. Whether the abnormality detection is performed or not may be determined by notification with, for example, an unillustrated switch or may be determined at regular intervals.

In S505, the detected position is updated by the relative position acquisition process, and the process returns to S504.

In S506, an abnormality detection process is performed, and the process proceeds to S507. The abnormality detection process will be described later.

In S507, it is determined whether abnormality is detected or not. If abnormality is not detected, the process proceeds to S504, and otherwise, the process proceeds to S508.

In S508, notification of abnormality is issued, and the process proceeds to S509. The notification of abnormality is performed by, for example, an unillustrated LED.

S509 is the end of the process.

Subsequently, with reference to FIGS. 6 and 7, an absolute position deriving process for acquiring an initial position in the operation flow according to this embodiment will be described.

The process starts in S601, and proceeds to S602.

In S602, the ABS deriver 101 outputs a second switch signal for switching to a second scale to the scale switcher 102, and the process proceeds to S603. In response to the second switch signal, the scale switcher 102 instructs the ABS sensor 103 to output a signal of a second track pattern, and the ABS sensor 103 outputs signals S2rA and S2rB of the second track pattern. The signals S2rA and S2rB of the second track pattern are converted to digital signals by the AD converter 104, and output to the ABS deriver 101.

In S603, a signal level V1s2rA of a second phase-A displacement signal S2rA and a signal level V1s2rB of a phase-B displacement signal S2rB at timing T1 of S603 output from the AD converter 104 are acquired, and the process proceeds to S604.

In S604, the ABS deriver 101 outputs a first switch signal for switching to a first scale to the scale switcher 102, and the process proceeds to S605. In response to the first switch signal, the scale switcher 102 instructs the ABS sensor 103 to output a signal of a first track pattern, and the ABS sensor 103 outputs signals S1rA and S1rB of the first track pattern. The signals S1rA and S1rB of the first track pattern are converted to digital signals by the AD converter 104, and output to the ABS deriver 101.

In S605, a signal level V2s1rA of the first phase-A displacement signal S1rA and a signal level V2s1rB of the phase-B displacement signal S1rB at timing T2 of S605 output from the AD converter 104, and the process proceeds to S606.

In S606, an absolute position Pabs is derived based on signals of the track patterns acquired in S603 and S605, and the process proceeds to S607. A method for deriving an absolute position will be described later.

S607 is the end of the process.

In the foregoing manner, an initial position of the movable member is determined.

A time interval between time T1 and time T2 will be hereinafter referred to as a signal acquisition delay time Ts. The signal acquisition delay time Ts is set as a time necessary for sufficiently stabilizing an output signal after switching of the scale by the scale switcher 102.

Then, the method for deriving an absolute position will be described. The absolute position is derived by the ABS deriver 101. FIG. 7 shows a flow in which an absolute position is derived.

In S701, the process starts and proceeds to S702.

In S702, a signal level V2s1rA of the first phase-A displacement signal S1rA and a signal level V2s1rB of the phase-B displacement signal S1rB at time T2 acquired in S605 shown in FIG. 6 are corrected.

Here, the first phase-A displacement signal S1rA and the first phase-B displacement signal S1rB can have different signal offsets and signal amplitudes. If an absolute position is derived using such signals without change, an error might occur in the derived absolute position Pabs. Thus, signal correction is needed.

In this embodiment, as described above, the pitch of four photodiodes (e.g., the pitch from the photodiode 401 to the photodiode 404) in the light receiver 204a is twice as large as the pitch P1 of the reflection portions of the first track pattern 203a. Thus, the first phase-A displacement signal S1rA and the first phase-B displacement signal S1rB can be respectively expressed as Expressions (1) and (2):

$$S1rA: a1 \times \cos \theta + s1 \quad (1)$$

$$S1rB: a2 \times \text{SIN } \theta + s2 \quad (2)$$

where a1 and s1 are respectively an amplitude and an offset of the first phase-A displacement signal S1rA, a2 and s2 are respectively an amplitude and an offset of the first phase-B displacement signal S1rB, and θ is a phase of a signal. The first phase-A displacement signal S1rA has a maximum value of s1+a1, a minimum value of s1−a1, a signal amplitude of a1, and an average value of s1. Similarly, the phase-B displacement signal S1rB has a maximum value of s2+a2, a minimum value of s2−a2, signal amplitude of a2, and an average value of s2. Using these values, the first phase-A displacement signal S1rA and the first phase-B displacement signal S1rB expressed by Expressions (1) and (2) are corrected so that the corrected first phase-A displacement signal S1cA and first phase-B displacement signal S1cB can be expressed as Expressions (3) and (4):

$$S1cA: ((a1 \times \text{COS } \theta + s1) - a2 = a1 \times a2 \times \text{COS } \theta \quad (3)$$

$$S1cB: ((a2 \times \text{SIN } \theta + s2) - s2) \times a1 = a1 \times a2 \times \text{SIN } \theta \quad (4)$$

Consequently, offsets of the first phase-A displacement signal S1rA and the first phase-B displacement signal S1rB are removed, and a first phase-A displacement signal S1cA and a first phase-B displacement signal S1cB having the same signal amplitude are obtained.

In the foregoing manner, the first phase-A displacement signal S1rA and the first phase-B displacement signal S1rB are corrected in S702, and the process proceeds to S703.

In S703, using the corrected first phase-A displacement signal S1cA and first phase-B displacement signal S1cB, a first relative position signal Inc1 having 40 periods with respect to the total length of the scale with an amplitude Vmax as shown in FIG. 8B is derived, and the process proceeds to S704. In FIGS. 8A to 8D, the abscissa represents a position relative to the total length Lmax of the scale, and the ordinate represents a corresponding signal level.

First, using the corrected first phase-A displacement signal S1cA and first phase-B displacement signal S1cB, an arc tangent operation is performed so that a signal Atan1 as shown in FIG. 8A is derived. Here, the first track pattern 203a is a pattern having 40 periods with respect to the total length Lmax of the scale. Thus, the signal Atan1 has 80 periods with respect to the total length of the scale.

Next, a first relative position signal Inc1 having 40 periods with respect to the total length of scale and having an amplitude Vmax is derived from Atan1. Specifically, the first relative position signal Inc1 is derived by applying gain to the signal Atan1 so that the amplitude of Atan1 is Vmax/2, and by adding Vmax/2 when the phase is in the range from 180° to 360° where the signal level when the phase of S1rB is 0° is defined as 0 (zero). Thus, the first relative position signal Inc1 is a sawtooth wave having 40 periods with respect to the total length Lmax of scale as shown in FIG. 8B.

As described above, in S702 and S703, a signal level V2inc1 of the first relative position signal Inc1 at T2 is derived from the signal level V2s1rA of the first phase-A displacement signal S1rA and the signal level V2s1rB of the phase-B displacement signal S1rB at T2, and the process proceeds to S704.

In S704, the signal level V1s2rA of the second phase-A displacement signal S2rA and the signal level V1s2rB of the phase-B displacement signal S2rB at T1 acquired in S603 in FIG. 6 are corrected.

Here, since the light receiver 204b has the same configuration as that of the light receiver 204a, the pitch of four photodiodes (e.g., the pitch from the photodiode 401 to the photodiode 404) in the light receiver 204b is twice as large as the pitch P1 of the reflection portions of the first track pattern 203a. Here, the pitch P1 of the reflection portions of the first track pattern 203a is different from the pitch P2 of the reflection portions of the second track pattern 203b. Accordingly, the pitch of four photodiodes (e.g., the pitch from the photodiode 401 to the photodiode 404) in the light receiver 204b is not twice as large as the pitch P2 of the reflection portions of the second track pattern 203b. Consequently, the second phase-A displacement signal S2rA and the second phase-B displacement signal S2rB shift from 90° in phase relationship.

Thus, the second phase-A displacement signal S2rA and the second phase-B displacement signal S2rB are expressed by Expressions (5) and (6) as follows:

$$S2rA: b1 \times \text{COS } \theta + t1 \quad (5)$$

$$S2rB: b2 \times \text{SIN}(\theta + \alpha) + t2 \quad (6)$$

where b1 and t1 are respectively an amplitude and an offset of the second phase-A displacement signal S2rA, b2 and t2 are respectively an amplitude and an offset of the second phase-B displacement signal S2rB, θ is a phase of a signal, and α is the amount of phase shift. In a manner similar to S602, when the second phase-A displacement signal S2rA and the second phase-B displacement signal S2rB are corrected, the corrected second phase-A displacement signal S2cA' and second phase-B displacement signal S2cB' are expressed by Expressions (7) and (8) as follows:

$$S2cA': \{(b1 \times \text{COS } \theta + t1) - t1\} \times b2 = b1 \times b2 \times \text{COS } \theta \quad (7)$$

$$S2cB': \{(b2 \times \text{SIN } (\theta + \alpha) + t2) - t2\}b1 = b1 \times b2 \times \text{SIN } (\theta + \alpha) \quad (8)$$

Consequently, the offsets t1 and t2 of the second phase-A displacement signal S2rA and the second phase-B displacement signal S2rB are removed, and the second phase-A displacement signal S2cA' and the second phase-B displacement signal S2cB' having the same signal amplitude are obtained.

Then, a process in which a phase difference between the second phase-A displacement signal S2cA' and the second phase-B displacement signal S2cB' is set at 90° will be described using Expressions (7) and (8).

Differences and sums in Expressions (7) and (8) are expressed by Equations (9) and (10) as follows:

$$b1 \times b2 \times (\text{SIN}(\theta + \alpha) - \text{COS}\theta) = \\ b1 \times b2 \times 2 \times \text{SIN}\{(\alpha - 90)/2\} \times \text{COS}\{\theta + (\alpha + 90)/2\} \quad (9)$$

$$b1 \times b2 \times (\text{SIN}(\theta + \alpha) + \text{COS}\theta) = \\ b1 \times b2 \times 2 \times \text{COS}\{(\alpha - 90)/2\} \times \text{SIN}\{\theta + (\alpha + 90)/2\} \quad (10)$$

In this manner, the phase differences in Equations (9) and (10) are 90°.

Since amplitudes in Equations (9) and (10) are different from each other, amplitudes are next corrected so as to derive the second phase-A displacement signal S2cA and the second phase-B displacement signal S2cB having the same signal amplitude. Equation (9) is multiplied by $\text{COS}\{(\alpha-90)/2\}$ as a part of the amplitude in Equation (10), and Equation (10) is multiplied by $\text{SIN}\{(\alpha-90)/2\}$ as a part of the amplitude in Equation (9). Then, Expressions (11) and (12) are obtained as follows:

Second phase-A displacement signal S2cA:

$$b1 \times b2 \times 2 \times \text{SIN}\{(\alpha-90)/2\} \times \text{COS}\{(\alpha-90)/2\} \times \text{COS}\{\theta + (\alpha+90)/2\} \quad (11)$$

Second phase-B displacement signal S2cB:

$$b2 \times b2 \times 2 \times \text{SIN}\{(\alpha-90)/2\} \times \text{COS}\{(\alpha-90)/2\} \times \text{SIN}\{\theta + (\alpha+90)/2\} \quad (12)$$

Consequently, the offsets of the second phase-A displacement signal S2rA and the second phase-B displacement signal S2rB are removed, the second phase-A displacement signal S2cA and the second phase-B displacement signal S2cB having the same signal amplitude and a phase difference of 90° are obtained.

In this manner, the second phase-A displacement signal S2rA and the second phase-B displacement signal S2rB are corrected in S704, and then, the process proceeds to S705.

In S705, an operation similar to that in S703 is performed using the corrected second phase-A displacement signal S2cA and second phase-B displacement signal S2cB, and a second relative position signal Inc2 is derived. Here, the second track pattern 203b has a pattern in which 39 periods are provided with respect to the total length Lmax of scale. Thus, the second relative position signal Inc2 is a sawtooth wave having 39 periods with respect to the total length Lmax of scale as shown in FIG. 8C. In FIGS. 8A to 8D, the abscissa represents a position relative to the total length Lmax of scale, and the ordinate represents a corresponding signal level.

In this manner, in S704 and S705, a signal level V1inc2 of the second relative position signal Inc2 at T1 is derived from the signal level V1s2rA of the second phase-A displacement signal S2rA and the signal level V1s2rB of the phase-B displacement signal S2rB at T1, and the process proceeds to S706.

For convenience of description, deriving of the first relative position signal at time T2 is performed first, and then, deriving of the second relative position signal at time T1 is performed. However, the present invention is, of course, not limited to this order, and deriving of the second relative position signal at time T1 may be performed first.

In S706, a Vernier signal Pv1 as shown in FIG. 8D is derived from the signal level V2inc1 of the first relative position signal Inc1 at T2 and the signal level V1inc2 of the second relative position signal Inc2 at T1. The Vernier signal Pv1 is obtained by calculating a difference between Inc1 and Inc2 and adding Vmax if the difference is a negative value.

Here, since the difference in period between the first relative position signal Inc1 and the second relative position signal Inc2 with respect to the total length Lmax of scale is 1 (one), the Vernier signal Pv1 is a sawtooth wave having a period with respect to the total length Lmax.

As described above, the Vernier signal Pv1 is derived in S706, and the process proceeds to S707.

In S707, an absolute position Pabs is derived.

Here, since S1rA, S1rB, S2rA, and S2rB include noise components due to disturbance or other factors, Inc1, Inc2, and Pv1 derived from these signals also include noise components. To correct the noise components, a synchronous operation of the Vernier signal Pv1 and the first relative position signal Inc1 is performed.

FIGS. 9A to 9D show how a wavelength changes with the synchronous operation.

In FIGS. 9A to 9D, the abscissa represents a position relative to the total length Lmax of scale, and the ordinate represents a corresponding signal level. The maximum value of the signal level is indicated as Vmax. In addition, N1 indicates an ordinal number of a period including a region from the start of scaling, and N1max is defined as the number of periods (maximum value of N1) in the total length Lmax. In this embodiment, since the first track pattern 203a has 40 periods with respect to the total length Lmax of scale, N1max is 40 and N1 is a natural number from 1 (one) to 40, both inclusive.

Figure 9A:
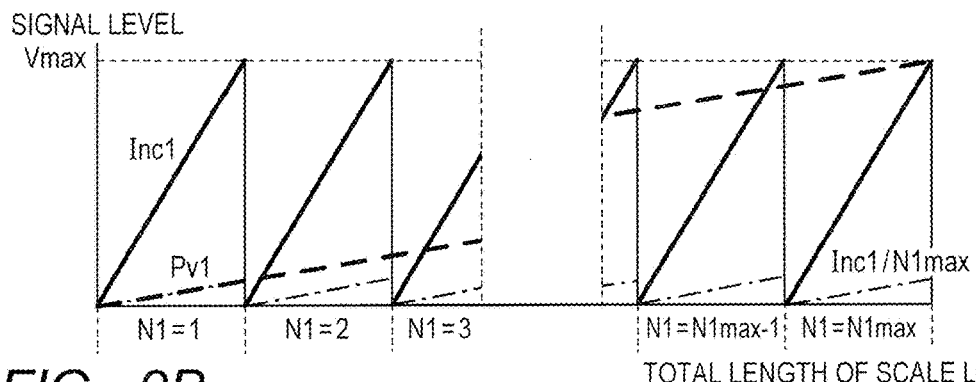
FIG. 9A shows waveforms of Inc1, Pv1, and Inc/N1max in a synchronous operation.
Figure 9B:
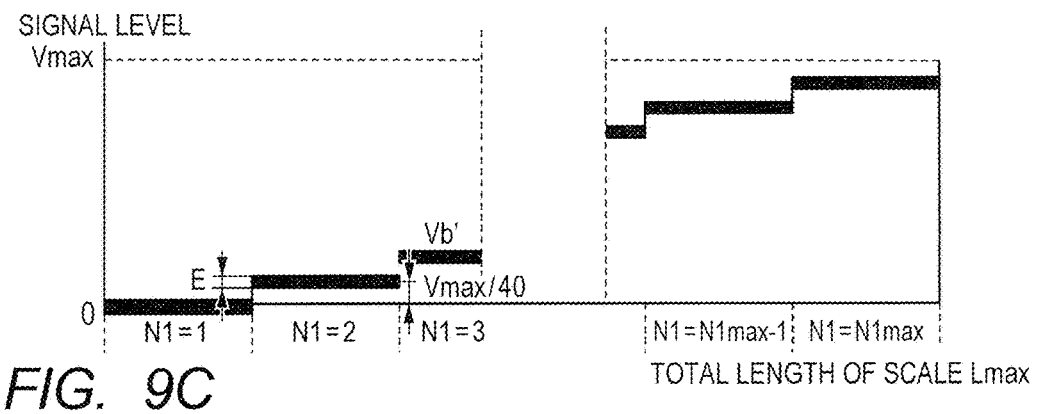
FIG. 9B shows a waveform of Vb' in the synchronous operation.

FIG. 9A shows waveforms of Inc1, Pv1, and Inc1/N1max. If a difference between Pv1 and Inc1/N1max at the same inclination as Pv1 is taken, a stepped waveform having an error component E and shown in FIG. 9B is generated. A signal Vb' of the waveform shown in FIG. 9B is expressed as Equation (13) below. In Equation (13), the signal level corresponding to one step of the stepped waveform is Vmax/N1max.

$$Vb'=Pv1-(Inc1/N1max) \quad (13)$$

Figure 9C:
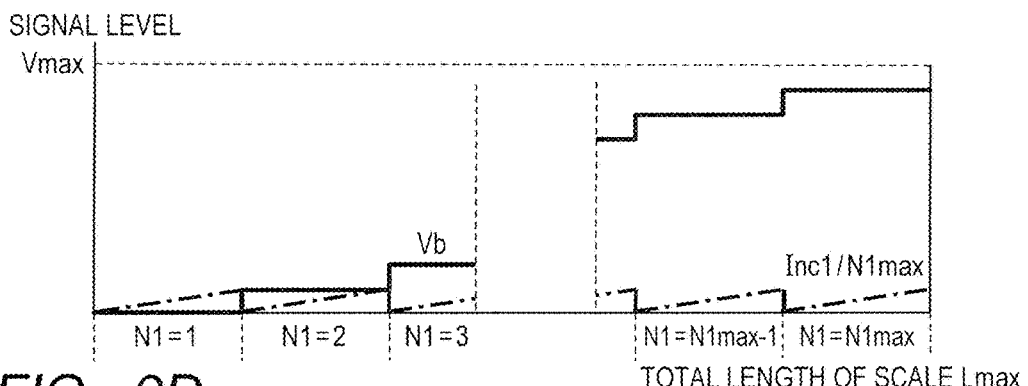
FIG. 9C shows a waveform of Vb in the synchronous operation.

Then, the error component E of the waveform shown in FIG. 9B is removed by rounding, a waveform shown in FIG. 9C is obtained. A signal Vb of the waveform shown in FIG. 9C is expressed by Equation (14) as follows:

$$Vb=\text{Round}[Vb' \times (N1max/Vmax)] \times (Vmax/N1max) \quad (14)$$

where Round [ ] is a function for rounding off to the first decimal place.

The error component E can be expressed by Equation (15):

$$E=[Pv1-(Inc1/n1max)]-Vb \quad (15)$$

Figure 9D:
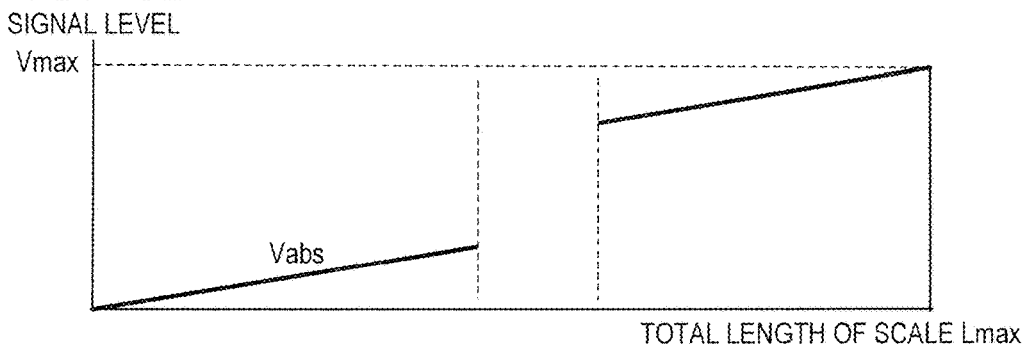
FIG. 9D shows a waveform of Vabs in the synchronous operation.

A waveform of Inc1/N1max is added to the waveform shown in FIG. 9C so that a signal Vabs showing an absolute position from which the error component E is removed and which is shown in FIG. 9D is generated.

This synchronous operation is performed by an operation expressed by Equation (16) as follows:

$$Vabs=Vb+(Inc1/N1max) \quad (16)$$

The synchronous operation is performed in the foregoing manner so that a signal obtained by synchronizing the Vernier signal Pv1 as a higher-order signal and the first relative position signal Inc1 as a lower-order signal is derived as the signal Vabs indicating an absolute position.

From the signal Vabs indicating the absolute position, the absolute position Pabs is expressed by Equation (17):

$$Pabs=Vabs \times (Lmax/Vmax) \quad (17)$$

As described above, in S707, when the absolute position Pabs at T2 is derived from the Vernier signal Pv1 and the signal level V2inc1 of the first relative position signal Inc1 at T2, the process proceeds to S708, and then is finished.

In the foregoing manner, the absolute position Pabs can be derived.

Next, referring to FIG. 10, an initialization process in deriving a relative position in the operation flow of this embodiment will be described.

The process starts in S1001, and proceeds to S1002.

In S1002, an absolute position Pabs derived immediately previously is acquired as an initial value of a relative position Pinc, and the process proceeds to S1003.

S1003 is the end of the process.

With this process, a reference position in deriving a relative position is determined.

Subsequently, referring to FIG. 11, a process of deriving a relative position in the operation flow of this embodiment will be described.

The process starts in S1101, and proceeds to S1102.

In S1102, a first phase-A displacement signal S1$r$A and a phase-B displacement signal S1$r$B are acquired, and the process proceeds to S1103. Details of the process in S1102 are similar to those of S605 shown in FIG. 6.

In S1103, the first phase-A displacement signal S1$r$A and the phase-B displacement signal S1$r$B are corrected, and the process proceeds to S1104. Details of the process in S1103 are similar to those of S702 shown in FIG. 7.

In S1104, a first relative position signal Inc1 is derived by using the corrected first phase-A displacement signal S1$c$A and first phase-B displacement signal S1$c$B, and the process proceeds to S1105. Details of the process in S1104 are similar to those of S703 shown in FIG. 7.

In S1105, the relative position Pinc is updated based on the first relative position signal Inc1 derived in S1104, and the process proceeds to S1106.

Specifically, a previous relative position signal Inc1A is derived from a previous position PincA by using Equation (18) as follows:

$$Inc1A=(PincA \times (Vmax/Lmax) \times N1max) \mod(N1max) \quad (18)$$

where operator mod represents a residue.

It should be noted that in order to omit this operation, Inc1 obtained when the previous position PincA is derived may be stored as Inc1A together with PincA.

Subsequently, a relative position displacement signal $\Delta$Inc1 as a difference between the relative position signal Inc1A and the Inc1B as the relative position signal Inc1 derived in S1104 are derived:

$$\Delta Inc1=Inc1B-Inc1A, \text{ when } -Vmax/2 \leq Inc1B-Inc1A \leq Vmax/2$$

$$\Delta Inc1=Inc1B-Inc1A+Vmax, \text{ when } Inc1B-Inc1A<-Vmax/2$$

$$\Delta Inc1=Inc1B-Inc1A-Vmax, \text{ when } Inc1B-Inc1A>Vmax/2 \quad (19)$$

Lastly, Pinc is updated using Equation (20) as follows:

$$Pinc=PincA+((\Delta Inc1/N1max) \times (Lmax/Vmax)) \quad (20)$$

S1106 is the end of the process.

In this relative position detecting process, if the position greatly moves in a sampling interval $\Delta$Tinc1 with the previous relative position, the amount of change cannot be correctly detected, and a positional shift occurs disadvantageously.

A maximum change amount $\Delta$Pinc1Max in which the position can move within the sampling interval $\Delta$Tinc1 of the relative position operation and no positional shift occurs can be obtained by Equation (21) as follows:

$$\Delta Pinc1Max=(Lmax/N1max)/2 \quad (21)$$

Thus, it is necessary to derive a relative position with a sampling interval $\Delta$Tinc1 in which the position does not move to a distance greater than or equal to $\Delta$Pinc1Max.

Referring to FIGS. 12 to 15, an abnormality detection process in the operation flow of this embodiment will be described.

The process starts in S1201, and proceeds to S1202.

In S1202, displacement signals at various timings used in the abnormality detection process are acquired, and the process proceeds to S1203. The signal acquisition process will be described in detail later.

In S1203, an absolute position is derived, and the process proceeds to S1204. The deriving of the absolute position will be described later.

In S1204, a correction process of correcting a movement amount in the relative position acquisition process and the absolute position acquisition process (within a time in which the absolute position is derived) is performed, and the process proceeds to S1205. The correction process of correcting the movement amount in the relative position acquisition process and the absolute position acquisition process will be described.

In S1205, the absolute position derived in S1203 and the relative position derived in S1204 are compared. If these positions coincide with each other, the process proceeds to S1206, and otherwise, the process proceeds to S1207.

In S1206, it is determined that no abnormality occurs, and the process proceeds to S1208.

In S1207, it is determined that abnormality occurs, and the process proceeds to S1208.

S1208 is the end of the process.

Thereafter, the signal acquisition process performed in S1202 will be described with reference to FIG. 13.

The process starts in S1301, and proceeds to S1302.

S1302 is a process similar to S605. Specifically, a signal level V11$s$1$r$A of the first phase-A displacement signal S1$r$A and a signal level V11$s$1$r$B of the phase-B displacement signal S1$r$B at timing T11 of S1302 output from the AD converter 104 are acquired, and the process proceeds to S1303.

S1303 and S1304 are processes similar to S602 and S603. Specifically, a signal level V12$s$2$r$A of the second phase-A displacement signal S2$r$A and a signal level V12$s$2$r$B of the phase-B displacement signal S2$r$B at timing T12 of S1304 are acquired, and the process proceeds to S1305.

S1305 is a process similar to S603. Specifically, a signal level V13$s$2$r$A of the second phase-A displacement signal S2$r$A and a signal level V13$s$2$r$B of the phase-B displacement signal S2$r$B at timing T13 of S1305 are acquired, and the process proceeds to S1306.

S1306 and S1307 are processes similar to S604 and S605. Specifically, a signal level V14$s$1$r$A of the first phase-A displacement signal S1$r$A and a signal level V14$s$1$r$B of the phase-B displacement signal S1$r$B at timing T14 of S1307 are acquired, and the process proceeds to S1308.

S1308 the end of the process.

A time interval between time T11 and time T12 and a time interval between time T13 and time T14 are a signal acquisition delay time Ts, and equal to each other. A time interval ΔTinc2 between time T12 and time T13 will be described later.

Then, a process of deriving an absolute position in S1203 will be described.

Figure 13:
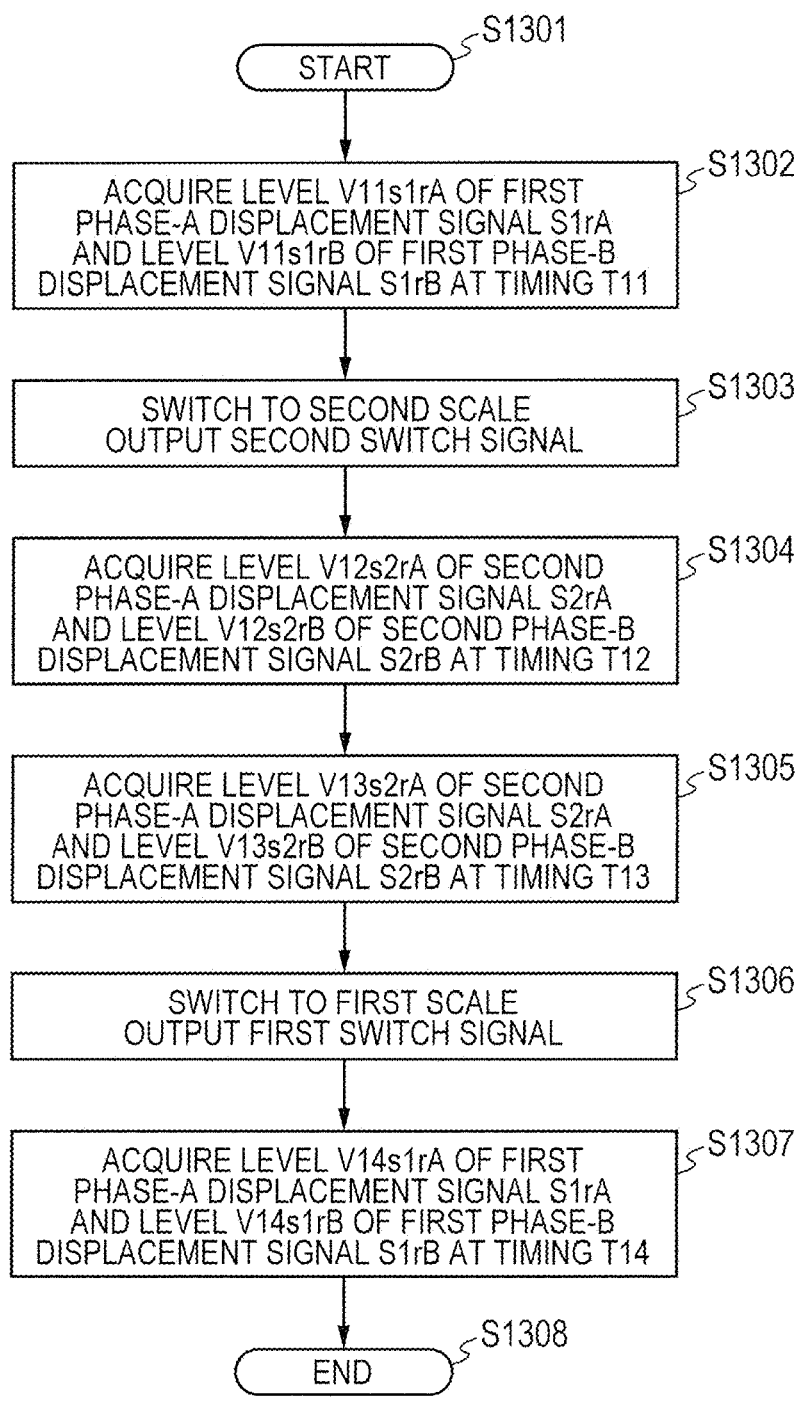
FIG. 13 is a flowchart showing signal acquisition in the abnormality detection operation.

In the process of deriving an absolute position, an absolute position Pabs is derived in a manner similar to the process flow shown in FIG. 7, by using V14s1rA and V14s1rB acquired in S1307 shown in FIG. 13 and V13s2rA and V13s2rB acquired in S1305 shown FIG. 13.

Figure 14:
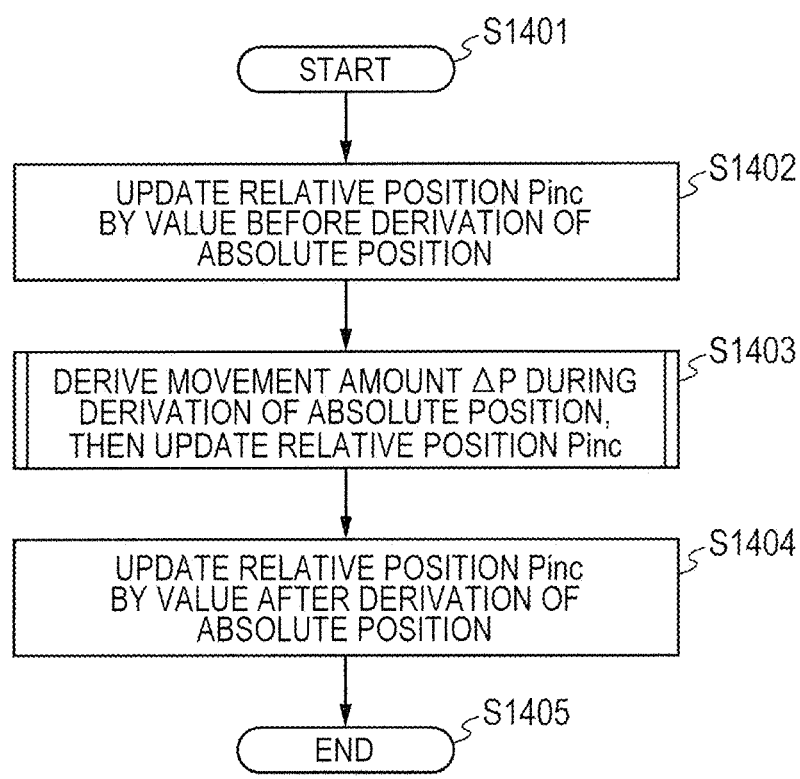
FIG. 14 is a flowchart showing movement amount correction.

Subsequently, the correction process of correcting the movement amount in the relative position acquisition process and the absolute position acquisition process in S1203 will be described with reference to FIG. 14. A correction of the movement amount (displacement amount) in the absolute position acquisition process is a correction of the amount of movement (amount of displacement) in a time in which a periodic signal for detecting a relative position (displacement amount from a predetermined absolute position) cannot be continuously detected during the process (within a time) of deriving the absolute position.

The process starts in S1401, and proceeds to S1402.

In S1402, the relative position Pinc is updated based on V11s1rA and V11s1rB acquired in S1302 shown in FIG. 13, and the process proceeds to S1403. The process of updating the relative position Pinc is similar to S1103, S1104, and S1105, and thus, description thereof is not repeated.

In S1403, a movement amount ΔP from time T11 to time T14 is derived by using V12s2rA and V12s2rB acquired in S1304 shown in FIG. 13 and V13s2rA and V13s2rB acquired in S1305 is derived, the relative position Pinc is updated, and the process proceeds to S1404. The deriving of the movement amount ΔP and the process of updating the relative position Pinc will be described later.

In S1404, the relative position Pinc is updated based on the relative position Pinc updated in S1403 and V14s1rA and V14s1rB acquired in S1307, and the process proceeds to S1405. The process of updating the relative position Pinc is similar to that in S1402, and description thereof is not repeated.

S1405 is the end of the process.

In the following description, a relative position before the update in S1402, the relative position updated in S1402, the relative position updated in S1403, and the relative position updated in S1404 will be hereinafter respectively referred to as Pinc11, Pinc12, Pinc13, and Pinc14.

Subsequently, deriving of the movement amount ΔP and the process of updating the relative position Pinc, that is, the process of deriving the relative position Pinc13 from the relative position Pinc12, as features of the present invention, will be described.

The process starts in S1501, and the process proceeds to S1502.

In S1502, V12s2rA and V12s2rB acquired in S1304 shown in FIG. 13 are corrected, and the process proceeds to S1503. Details of the process in S1502 are similar to those in S704 shown in FIG. 7.

In S1503, a second relative position signal V12Inc2 is derived using the signals corrected in S1502, and the process proceeds to S1504. Details of the process in S1503 are similar to those in S705 shown in FIG. 7.

In S1504 and S1505, in a manner similar to S1502 and S1503, a second relative position signal V13Inc2 is derived from V13s2rA and V13s2rB acquired in S1305 shown in FIG. 13, and the process proceeds to S1506.

In S1506, a movement amount ΔP from time T11 to time T14 is derived by using V12Inc2 and V13Inc2, and the process proceeds S1507.

Specifically, the amount of change ΔInc2 in a time interval ΔTinc2 that is a time interval from time T12 to time T13 is derived from V12Inc2 and V13Inc2, by Equation (22) as follows:

$\Delta Inc2 = V13Inc2 - V12Inc2$, when $-Vmax/2 \le V13Inc2 - V12Inc2 \le Vmax/2$ $\Delta Inc2 = V13Inc2 - V12Inc2 + Vmax$, when $V13Inc2 - V12Inc2 < -Vmax/2$ $\Delta Inc2 = V13Inc2 - V12Inc2 - Vmax$, when $V13Inc2 - V12Inc2 > Vmax/2$ (22)

In the process of deriving the change amount ΔInc2, if the position greatly moves in the time interval ΔTinc2, the change amount cannot be correctly detected, and a positional shift occurs.

A maximum change amount ΔPinc2Max with which the position can move in the time interval ΔTinc2 and no positional shift occurs, can be obtained by Equation (23) as follows:

$\Delta Pinc2Max = (Lmax/N2max)/2$ (23)

Thus, it is necessary to perform S1304 and S1305 shown in FIG. 13 with the time interval ΔTinc2 in which the position does not move to ΔPinc2Max or more.

A change amount ΔInc2' from time T11 to time T14 can be derived by using the time interval ΔTinc2 and the signal acquisition delay time Ts from Equation (24) as follows:

$\Delta Inc2' = (\Delta Inc2/\Delta Tinc2) \times (2 \times Ts + \Delta Tinc2)$ (24)

Then, a movement amount ΔP as a position is derived by Equation (25) as follows:

$\Delta P = ((\Delta Inc2'/N2max) \times (Lmax/Vmax))$ (25)

In this manner, a movement amount ΔP is derived.

In S1507, a relative position Pinc13 is derived from the relative position Pinc12 by using the movement amount ΔP, and the process proceeds to S1508.

Specifically, the relative position Pinc13 is derived by Equation (26) as follows:

$Pinc13 = Pinc12 + \Delta P$ (26)

S1508 is the end of the process.

In the process described above, the movement amount in the time interval from time T11 to time T14 in which Inc1 cannot be acquired because of deriving of the absolute position can be derived from Inc2 different from Inc1. Based on this movement amount, the relative position can be corrected so that a relative position can be correctly derived.

Advantages obtained by deriving a movement amount in a time interval in which Inc1 cannot be acquired because of deriving of an absolute position and correcting Pinc will now be described.

Figure 16A:
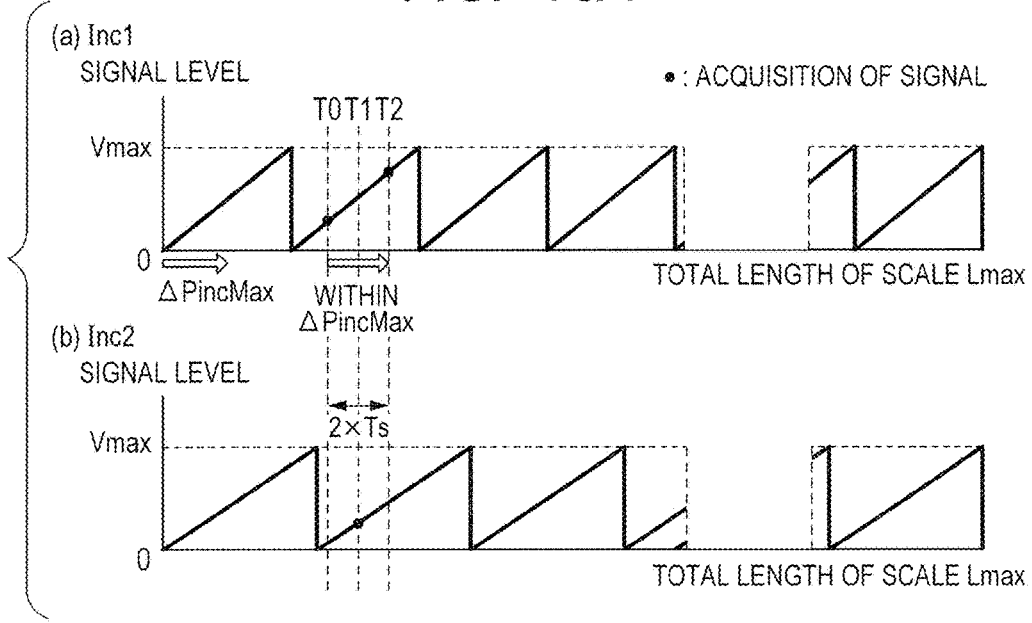
FIG. 16A is a graph showing an operation of the movement amount correction and shows signal acquisition positions.

In a case where the present invention is not applied in the configuration of this embodiment, to derive an absolute position in a state in which a relative position is derived, an output signal needs to be at least switched in the following manner. That is, as shown in FIG. 16A, the output signal is switched from a state in which a first displacement signal is output to a state in which a second displacement signal is output at time T0, and a second displacement signal is acquired at time T1. Thereafter, the output signal is switched to the state in which the first displacement signal is output again, and the first displacement signal is acquired at time T2. At this time, the time during which the process of deriving the relative position is stopped is at least twice as long as the signal acquisition delay time Ts.

If the position moves to a distance greater than or equal to a change amount ΔPinc1Max of a position in which movement is allowed during sampling of a relative position operation in a time 2×Ts during which the process of deriving the relative position is stopped, a shift occurs in an obtained relative position. Consequently, an abnormality detection process using a comparison between the absolute position and the relative position cannot be normally performed.

Figure 16B:
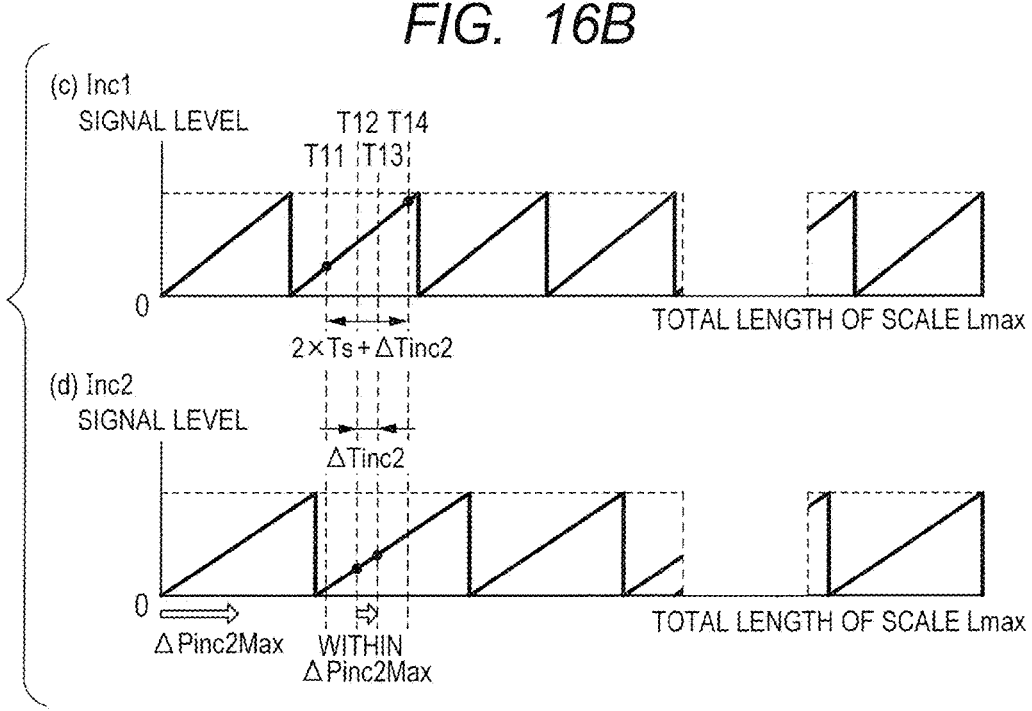
FIG. 16B is a graph showing an operation of the movement amount correction and signal acquisition positions.

On the other hand, in the process described in this embodiment, as shown in FIG. 16B, the time during which the process of deriving the relative position as expressed by Equation (22) is stopped is 2×Ts+ΔTinc2. However, since the movement amount ΔP in the time period in which the process of deriving the relative position is stopped is derived by acquiring a signal using the time interval ΔTinc2, the relative position can be normally derived as long as the movement amount in the time interval ΔTinc2 is within ΔPinc2Max. As a result, an abnormality detection process using a comparison between the absolute position and the relative position can be normally performed.

In this embodiment, the movement amount ΔP in the time period during which the process of deriving the relative position is stopped is derived by using only ΔInc2 acquired in this period.

However, similar advantages can be obtained by acquiring Inc1 twice immediately before and immediately after stopping of the process of deriving the relative position to derive ΔInc1 and then performing an operation on the movement amount ΔP. It should be noted that a time during which the process of deriving the relative position is actually stopped can be derived by deriving the movement amount in the time period during which the process of deriving the relative position is stopped using Inc2.

After the movement amount has been corrected, the relative position is derived based on the relative position Pinc13 subjected to the correction of the movement amount and the relative position Pinc14 is updated. Thus, the relative position Pinc13 subjected to the correction of the movement amount is allowed to have a certain degree of an error. Specifically, the relative position Pinc13 only needs to be corrected within the range of ±ΔPinc1Max from an actual position in order to update Pinc14 to the actual position in the subsequent process of deriving the relative position.

Here, from Equations (21) and (23), Equation (27) is established as follows:

$$\Delta Pinc2\text{Max}=(N1\text{max}/N2\text{max})\times \Delta Pinc1\text{Max} \quad (27)$$

In this embodiment, since N1max is 40 and N2max is 39, the change amount with which no positional shift occurs in deriving the movement amount ΔP is larger in the case of ΔPinc2Max than in the case of ΔPinc1Max. Thus, the case of deriving the movement amount using Inc2 is more advantageous for deriving the movement amount. That is, the case of deriving the movement amount using Inc2 can achieve relative position detection with which a positional shift is less likely to occur.

To increase the accuracy, a movement amount may be derived from each of ΔInc1 immediately before stopping of the process of deriving the relative position, ΔInc2 in the middle of the stopping, and ΔInc1 immediately after the stopping, and the obtained movement amounts are averaged so as to derive a movement amount ΔP for use in correction.

Second Embodiment

A second embodiment of the present invention will be described with reference to FIGS. 17 to 23.

Figure 17:
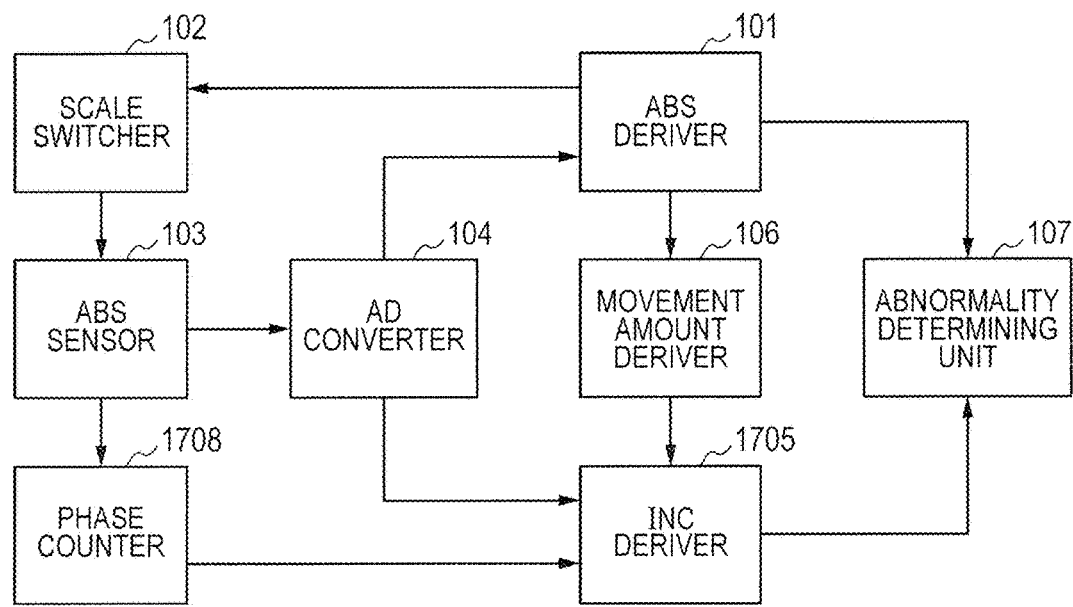
FIG. 17 is a block diagram illustrating a configuration according to a second embodiment.

FIG. 17 is a block diagram illustrating a configuration according to the second embodiment. Description of components shown in FIG. 17 having similar structures as those in the first embodiment will not be repeated.

A position detection apparatus according to this embodiment includes a phase counter 1708 that counts a phase change of a signal, and uses a count value obtained by the phase counter 1708 in deriving a relative position, as a feature of this embodiment. The phase counter 1708 is a counter that converts an analog signal from an ABS sensor 103 to a digital signal using, for example, a comparator and counts a phase change. The phase counter will be described in detail later.

An INC deriver 1705 is an arithmetic section that derives a relative position Pinc from a signal from the AD converter 104 and the count value of the phase counter 1708.

An ABS deriver 101, the INC deriver 1705, a movement amount deriver 106, an abnormality determining unit 107, and the phase counter 1708 are provided in, for example, one CPU.

Next, an operation flow according to the second embodiment will be described.

First, since the operation flow of the entire process is similar to that of the first embodiment shown in FIG. 5, and thus, description thereof will not be repeated.

An absolute position acquisition process for acquiring an initial position is also similar to that of the first embodiment shown in FIGS. 6 and 7, and thus, description thereof will not be repeated.

Figure 18:
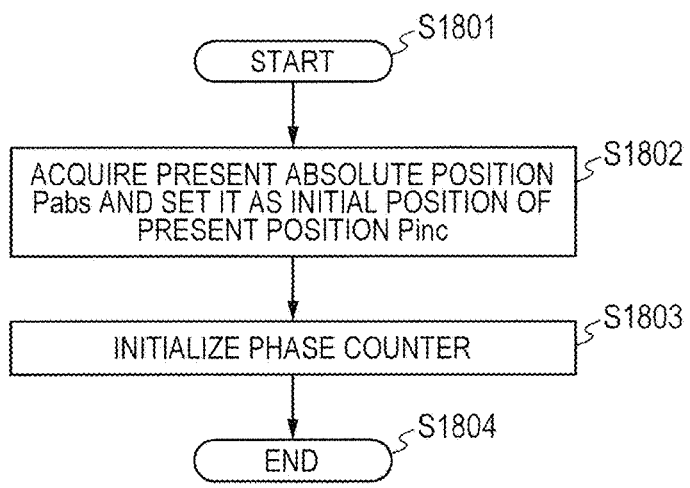
FIG. 18 is a flowchart showing an initialization operation for deriving a relative position.

Thereafter, an initialization process for acquiring a relative position will be described with reference to FIG. 18.

The process starts in S1801, and proceeds to S1802.

In S1802, a process similar to that in S1002 shown in FIG. 10 in the first embodiment is performed, and the process proceeds to S1803.

In S1803, the phase counter 1708 is initialized, and the process proceeds to S1804.

S1804 is the end of the process.

The initialization of the phase counter 1708 will be described.

Figure 19:
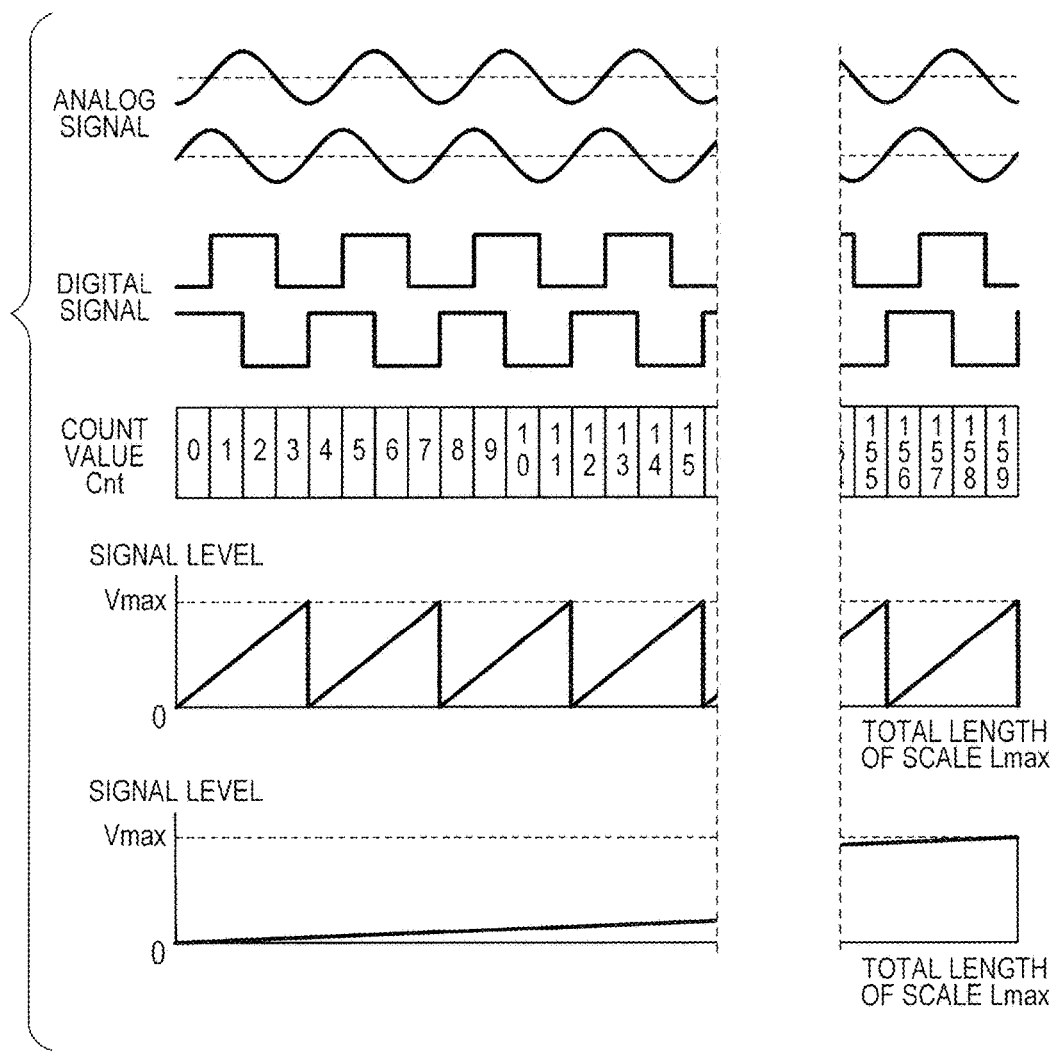
FIG. 19 shows graphs showing a relationship between an input signal and a count value of a phase counter.

FIG. 19 shows an analog signal of a first track pattern from the ABS sensor 103, a digital signal converted by, for example, the comparator, and a count value Cnt of the phase counter. In FIG. 19, a first relative position signal Inc1 and a correspondence with a position P are also shown.

The count value Cnt is initialized in such a manner that the count value Cnt is 0 (zero) when the position P is 0 (zero). The count value has four counts in one period of an analog signal of the first track pattern, and specifically obtained by Equation (28) as follows:

$$Cnt=\text{integer portion of } (Pabs\times N1\text{max}\times 4/L\text{max}) \quad (28)$$

Specifically, when the position P is 0 (zero), the count value Cnt is 0 (zero), and when the position P is the total length Lmax of scale, the count value Cnt is N1max×4−1.

In this manner, a count value can be correctly determined as an initial position.

Thereafter, the phase counter is started. The function of the phase counter is the function incorporated in, for example, the CPU, and is not specifically described here.

Figure 20:
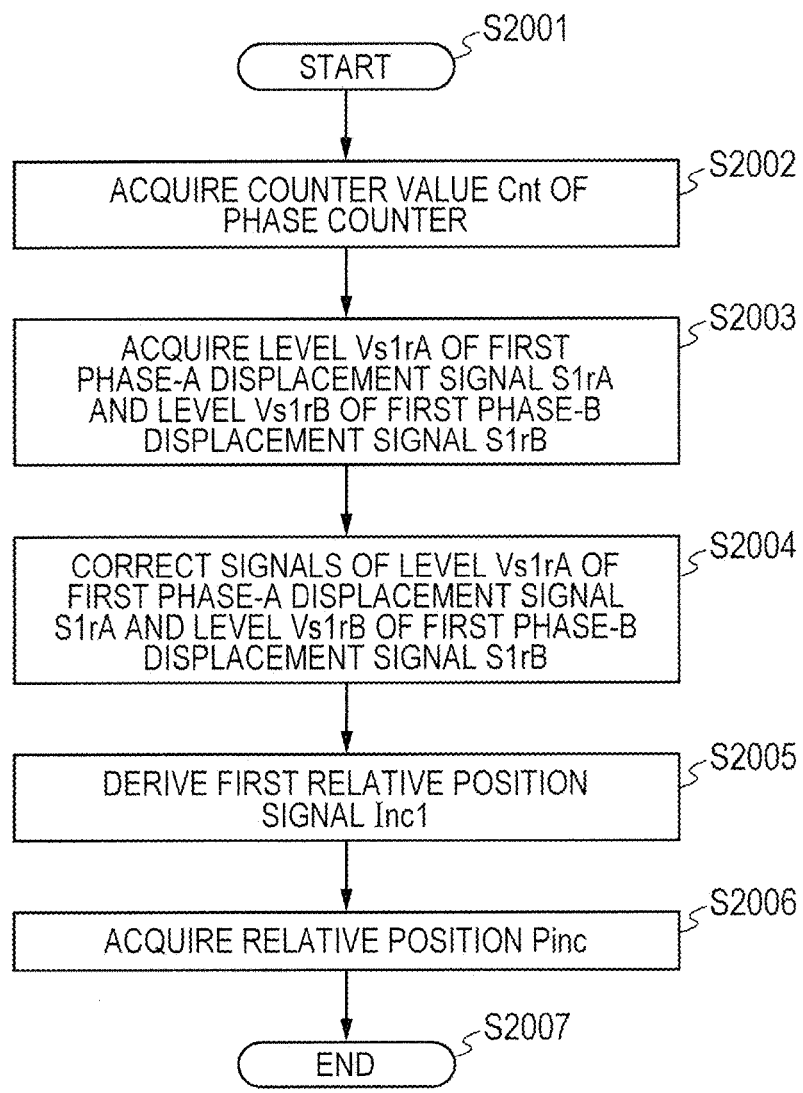
FIG. 20 is a flowchart showing deriving of a relative position.

Then, a relative position acquisition process will be described with reference to FIG. 20.

The process starts in S2001, and proceeds to S2002.

In S2002, a count value Cnt of the phase counter is acquired, and the process proceeds to S2003.

In S2003, S2004, and S2005, processes similar to those in S605, S702, and S703 are performed, and the process proceeds to S2006.

In S2006, a relative position Pinc is derived based on the count value Cnt acquired in S2002 and the first relative position signal Inc1 derived in S2005, and the process proceeds to S2007.

Specifically, first, a phase shift between the count value Cnt and the first relative position signal Inc1 is corrected using Equation (29) as follows:

$$Cnt = Cnt(Cnt \bmod 4 - (\text{integer portion of } Inc1/V\max \times 4) = 0) = \quad (29)$$
$$Cnt - 1(Cnt \bmod 4 - (\text{integer portion of } Inc1/V\max \times 4) =$$
$$1 \text{ or } -3) =$$
$$Cnt + 1(Cnt \bmod 4 - (\text{integer portion of } Inc1/V\max \times 4) =$$
$$3 \text{ or } -1) = Cnt(Cnt \bmod 4 -$$
$$(\text{integer portion of } Inc1/V\max \times 4) = 2 \text{ or } -2)$$

As shown in this equation, correction can be performed as long as the phase shift between the count value Cnt and the first relative position signal Inc1 is within ±1. On the other hand, correction cannot be performed if the phase shift is ±2. However, the phase shift can be reduced within at least ±1 by acquiring the count value Cnt and the first relative position signal Inc1 substantially at the same time.

Thereafter, Pinc is derived by Equation (30) as follows:

$$Pinc=((\text{integer portion of } Cnt/4) \times V\max + Inc1)/$$
$$N1\max \times (L\max/V\max) \quad (30)$$

S2007 is the end of the process.

Subsequently, an abnormality detection process will be described.

Figure 12:
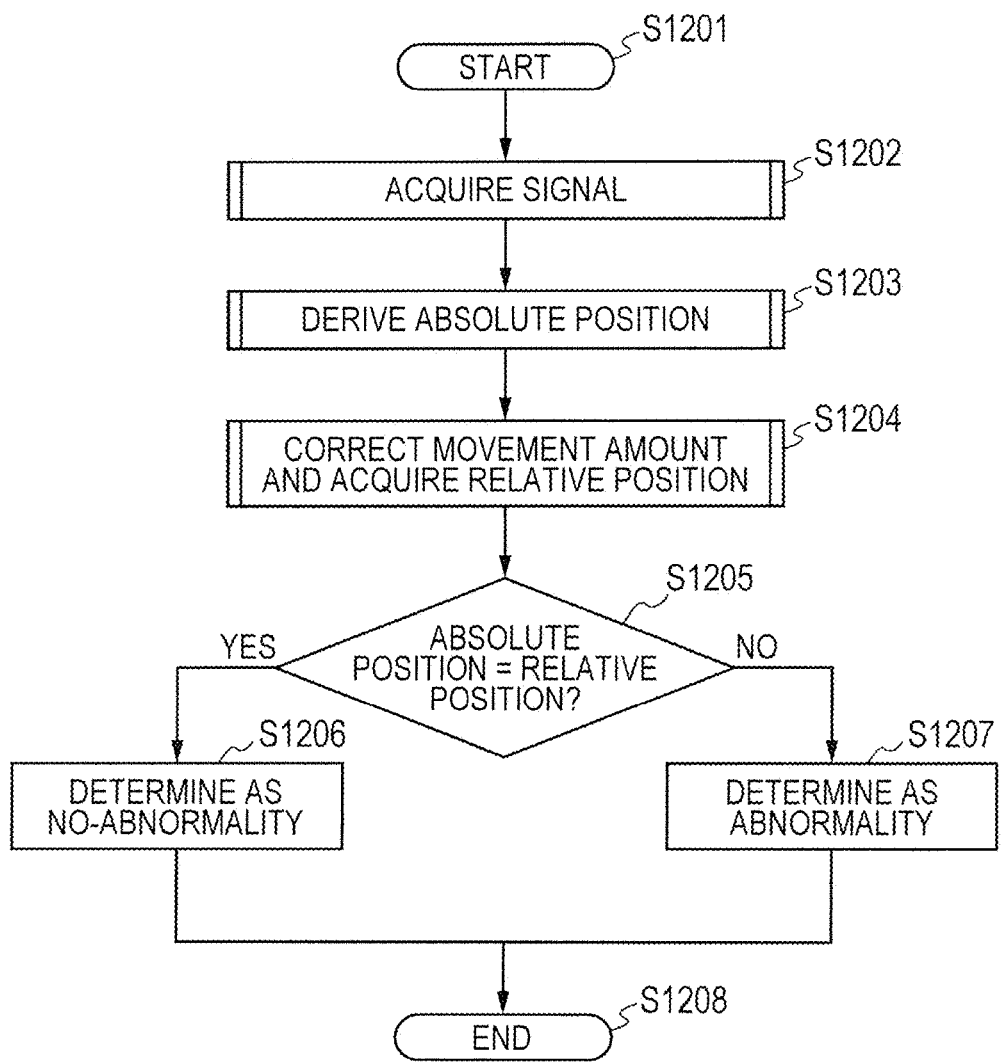
FIG. 12 is a flowchart showing an abnormality detection operation.

The entire flow of the abnormality detection process is the same as that shown in FIG. 12.

The signal acquisition process shown in FIG. 12 will be described with reference to FIG. 21.

The process starts in S2101, and proceeds to S2102.

In S2102, the phase counter is stopped, and the process proceeds to S2103. This process is necessary for preventing a displacement of a signal in switching to a first scale from being counted. The timing at which the phase counter is stopped in S2102 is indicated as T11.

S2103 and S2104 are similar to S602 and S603. Specifically, a signal level $V12s2rA$ of a second phase-A displacement signal $S2rA$ and a signal level $V12s2rB$ of a phase-B displacement signal $S2rB$ at timing T12 of S2104 are acquired, and the process proceeds to S2105.

A process in S2105 is similar to that in S603, a signal level $V13s2rA$ of the second phase-A displacement signal $S2rA$ and a signal level $V13s2rB$ of the phase-B displacement signal $S2rB$ at timing T13 of S2105 are acquired, and the process proceeds to S2106.

S2106 and S2107 are similar to S604 and S605. Specifically, a signal level $V14s1rA$ of the first phase-A displacement signal $S1rA$ and a signal level $V14s1rB$ of the phase-B displacement signal $S1rB$ at timing T14 of S2107 are acquired, and the process proceeds to S2108.

In S2108, the phase counter is started, and the process proceeds to S2109.

S2109 is the end of the process.

A time interval between time T11 and time T12 and a time interval between time T13 and time T14 are a signal acquisition delay time Ts, and equal to each other. A time interval ΔTinc2 between time T12 and time T13 is similar to that in the first embodiment, and description will not be repeated.

Figure 21:
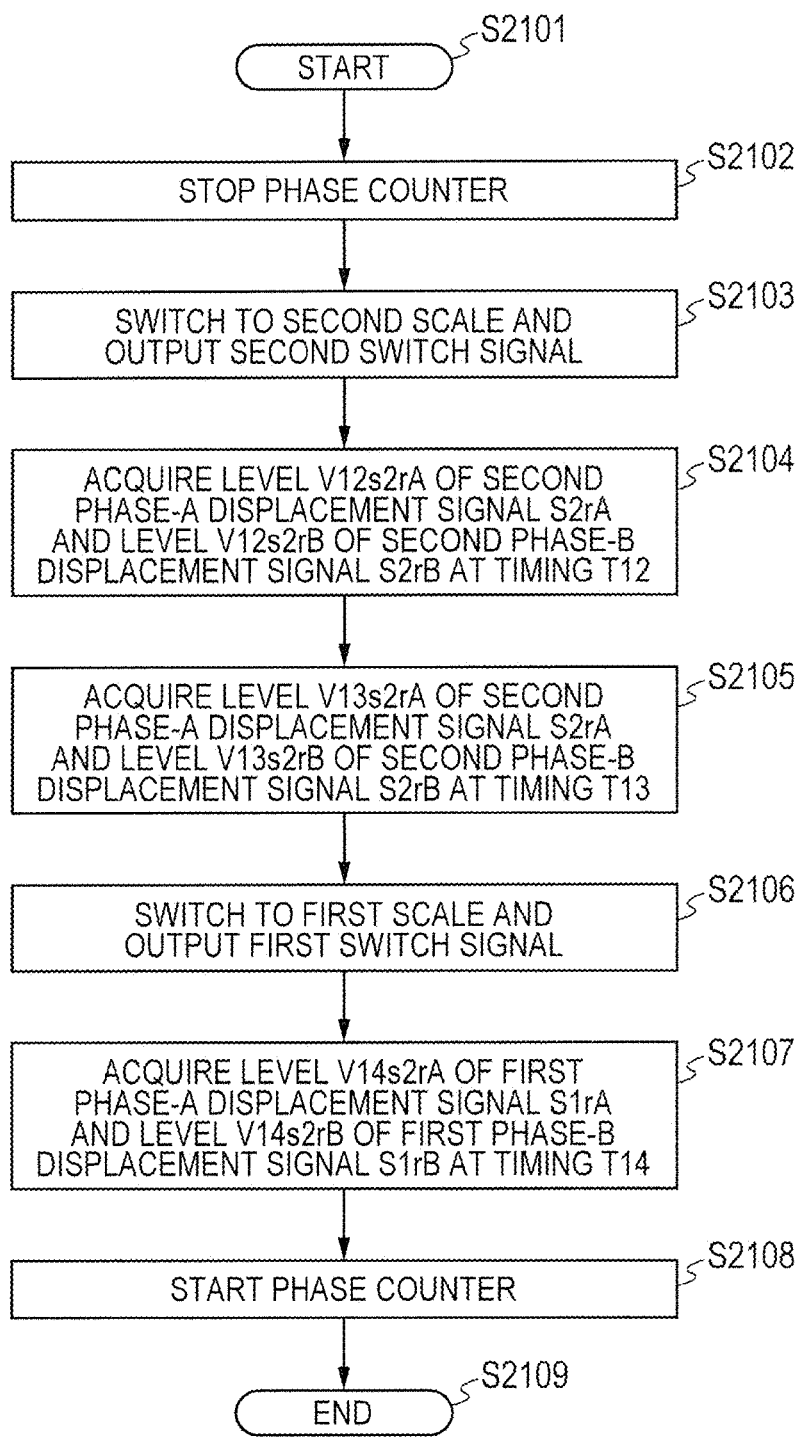
FIG. 21 is a flowchart showing signal acquisition in an abnormality detection operation.

In the absolute position deriving process shown in FIG. 12, in a manner similar to the process flow shown in FIG. 7, an absolute position Pabs is derived by using $V14s1rA$ and $V14s1rB$ acquired in S2107 shown in FIG. 21 and $V13s2rA$ and $V13s2rB$ acquired in S2105 shown in FIG. 13.

Figure 22:
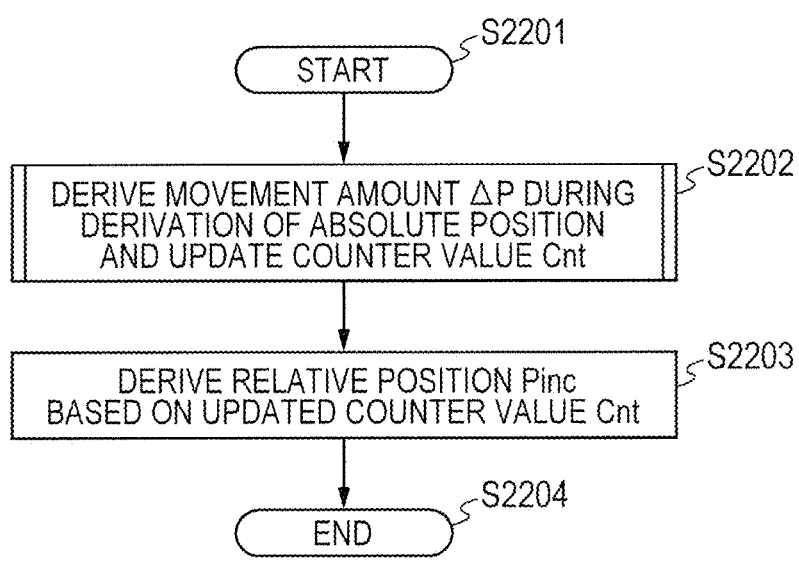
FIG. 22 is a flowchart showing movement amount correction.
Figure 23:
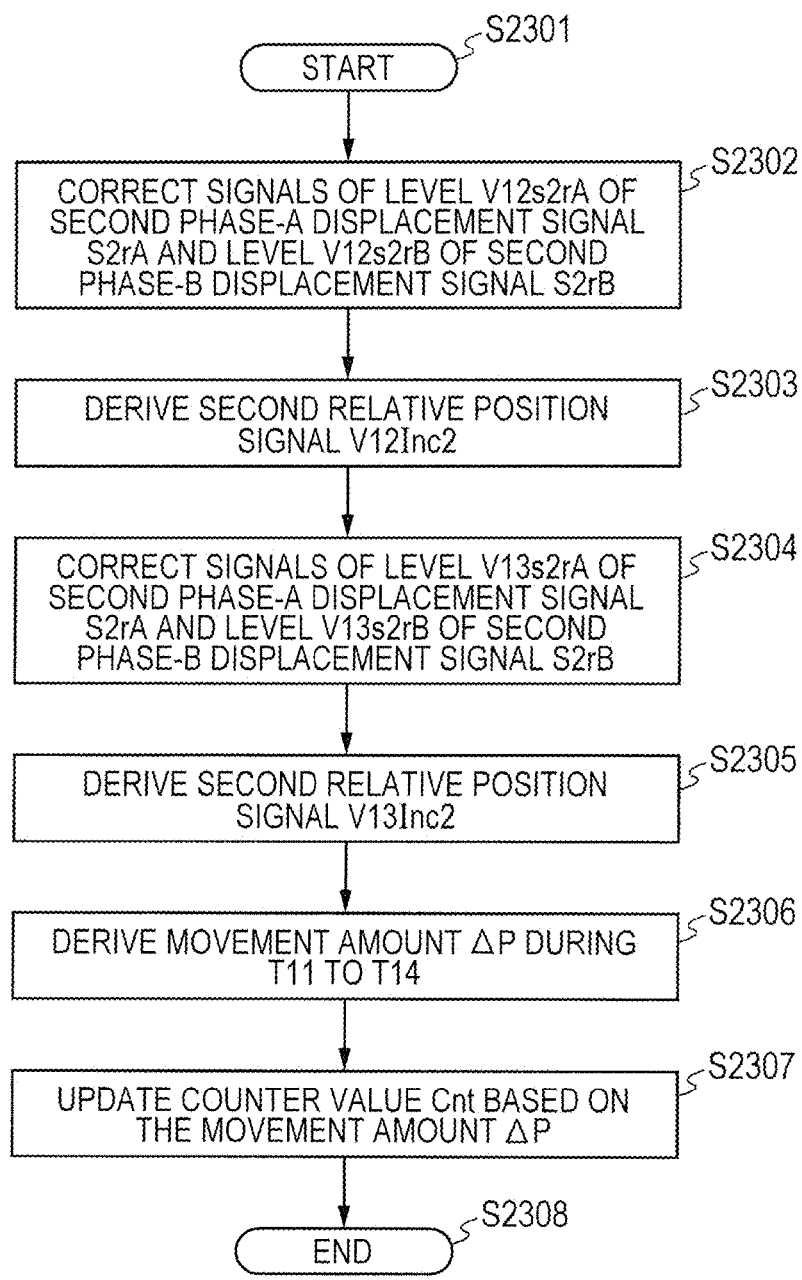
FIG. 23 is a flowchart showing details of the movement amount correction

A correction process of correcting a movement amount in the relative position acquisition process and the absolute position acquisition process shown in FIG. 12 will be described with reference to FIGS. 22 and 23.

The process starts in S2201, and proceeds to S2202.

In S2202, a movement amount ΔP from time T11 to time T14 is derived by using $V12s2rA$ and $V12s2rB$ acquired in S2104 shown in FIG. 21 and $V13s2rA$ and $V13s2rB$ acquired in S2105, the count value Cnt is updated, and the process proceeds to S2203. The process of updating the count value Cnt will be described later. The deriving of the movement amount ΔP is similar to that in the first embodiment, and description thereof is not repeated.

In S2203, a relative position Pinc is derived from the count value Cnt updated in S2202 and $V14s1rA$ and $V14s1rB$ acquired in S2107, and the process proceeds to S2204. The process of deriving the relative position Pinc is similar to those in S2004, S2005, and S2006, and description thereof is not repeated.

S2204 is the end of the process.

Subsequently, the process of updating the count value Cnt, which is a feature of the present invention, will be described with reference to FIG. 23.

The process starts in S2301, and the process proceeds to S2302.

Figure 15:
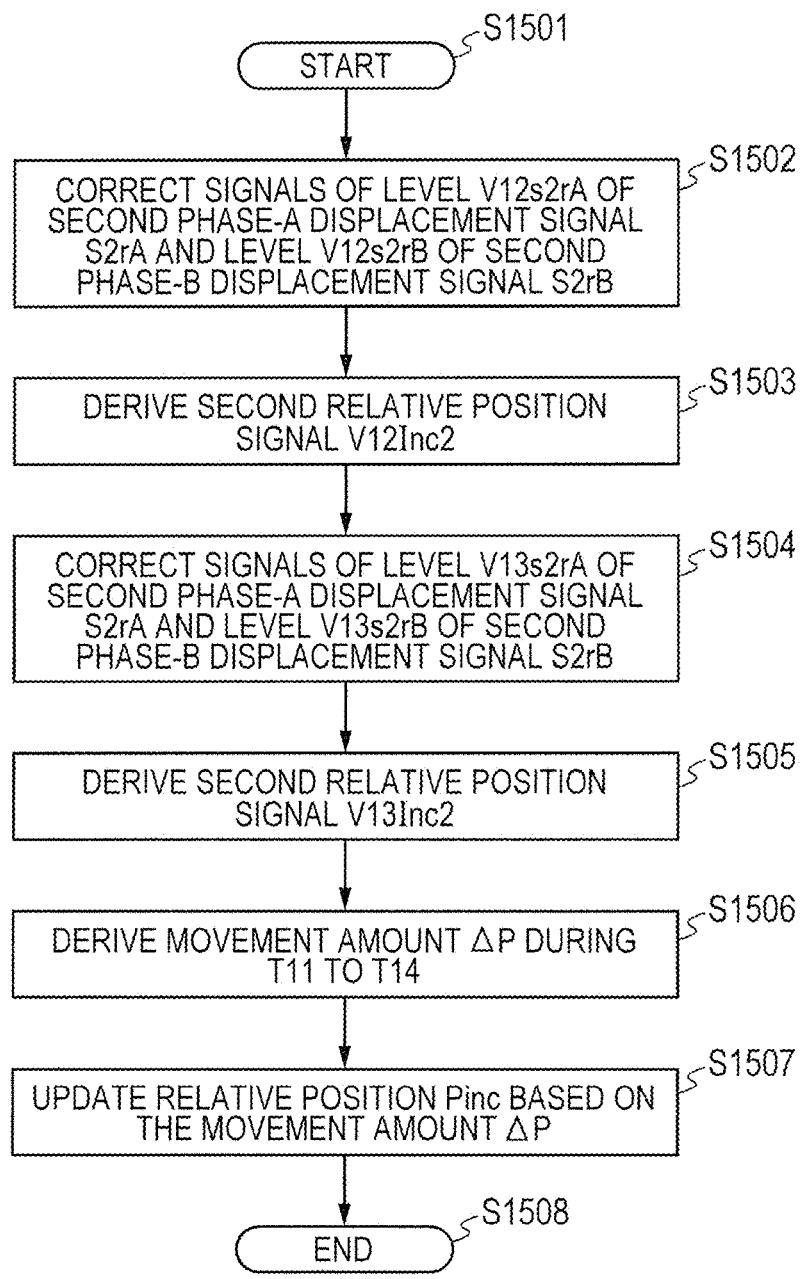
FIG. 15 is a flowchart showing details of the movement amount correction.

S2302 to S2306 are similar to S1502 to S1506 of the first embodiment shown in FIG. 15, and the process proceeds to S2307.

In S2307, the count value Cnt is updated using the movement amount ΔP, and the process proceeds to S2308.

Specifically, the count value Cnt is updated by Equation (31) as follows:

$$Cnt=Cnt+(\text{integer portion of } \Delta P \times N1\max \times 4/L\max) \quad (31)$$

After this process, in generating a relative position Pinc in S2203, a correction process of correcting a phase shift between the count value Cnt and the first relative position signal Inc1 expressed by Equation (29) is performed. Thus, Cnt updated by Equation (31) only needs to be within the range from the count value at an actual position to ±1, and ΔP does not need to be highly accurately derived.

S2308 is the end of the process.

In the foregoing process, a movement amount in the time interval from time T11 to time T14 during which the phase counter needs to be stopped in order to derive an absolute position can be derived. In addition, the phase counter can be updated based on the movement amount to derive a relative position accurately.

As described above, in the time period during which deriving of the relative position is stopped, a movement amount in this period is derived and corrected in deriving the relative position so that the relative position can be correctly derived even when deriving of the relative position is stopped.

The configuration described in this embodiment uses an encoder with two track patterns having different pitches. However, the present invention is not limited to this example.

Figure 24A:
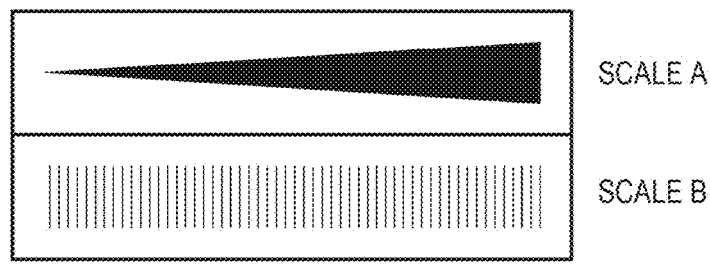
FIG. 24A illustrates one of various scale units.
Figure 24B:
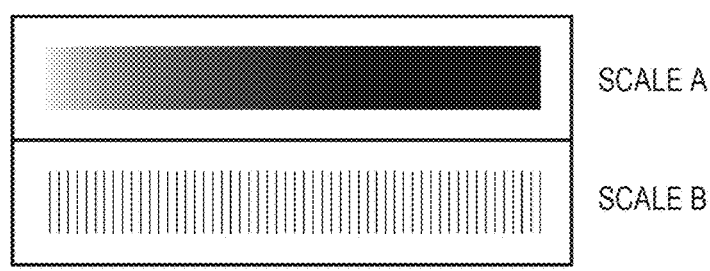
FIG. 24B illustrates another one of various scale units.

For example, as illustrated in FIGS. 24A and 24B, similar advantages can be obtained in the case of two signals one of which is a periodic signal and the other is a signal that monotonously increases or monotonously decreases with respect to the position of the movable member.

Figure 24C:
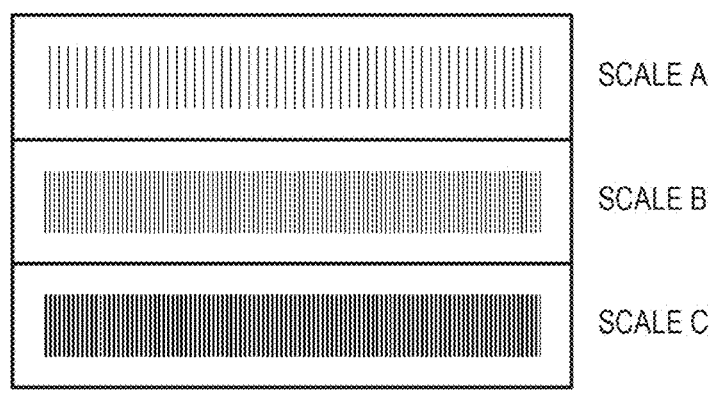
FIG. 24C illustrates still another one of various scale units.

As illustrated in FIG. 24C, the present invention is also applicable to a configuration using three or more encoders.

For example, in a position detection unit having a configuration in which three types of signals, i.e., dense, intermediate, and sparse signals, are acquired in the order of intermediate, sparse, intermediate, and dense signals so that an absolute positions are acquired based on sparse, intermediate, and dense signals, and a movement amount is derived based on intermediate signals acquired twice. Of course, signals may be acquired in the order of sparse, intermediate, sparse, and dense signals so that an absolute position is acquired based on sparse, intermediate, and dense signals and a movement amount is derived based on sparse signals acquired twice. In this case, the CPU (including the ABS deriver, the INC deriver, the movement amount deriver, and the abnormality determining unit) controls a scale switcher (switcher) so as to output an instruction specifying a desired one of dense, intermediate, and sparse signals to be output to the ABS sensor.

Advantages of the present invention can be obtained with a configuration in which each of a dense signal and a sparse signal is acquired twice so that a correction amount is approximated by using the sparse signal and the accuracy is enhanced by using the dense signal.

In the illustrated embodiments, the correction amount is derived based on a specific periodic signal obtained twice at different timings. Alternatively, the correction amount may be derived based on a specific periodic signal acquired a plurality of times at different timings. The correction amount may be derived based on a plurality of periodic signals acquired a plurality of times at different timings. For example, in the encoder for acquiring the absolute position based on the sparse, intermediate, and dense signals described above, a correction amount may be derived based on the sparse signal and the intermediate signal (one or more signals) acquired a plurality of times at different timings so as to enhance the accuracy.

Figure 24D:
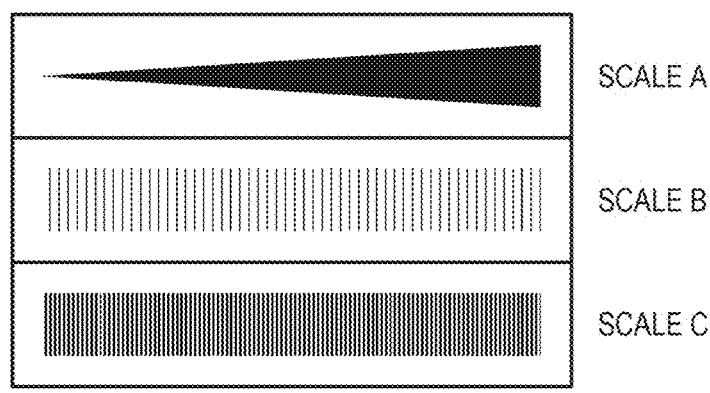
FIG. 24D illustrates yet another one of various scale units.

Furthermore, as illustrated in FIG. 24D, similar advantages can be obtained in a configuration using a combination of a plurality of periodic signals and a signal that monotonously increases or monotonously decreases.

In the illustrated embodiments, an optical encoder is used as the encoder. However, the present invention is not limited to this example, and a magnetic or capacitance encoder may be used.

In addition, the position detection apparatus for deriving an absolute position has been described as an example. Alternatively, similar advantages can be obtained by a position detection apparatus having a plurality of periods with respect to the entire range.

The position detection apparatus according to the present invention described in the embodiments may be applied to a lens apparatus including a movable optical member. Then, a small-size lens apparatus that can detect an absolute position and a relative position with accuracy can be obtained.

A small-size image pickup apparatus that can detect an absolute position and a relative position accurately can be obtained with a configuration characterized by including the lens apparatus including a movable optical member having the position detection apparatus according to the present invention, and an image pickup element that receives light from the lens apparatus.

In addition, a small-size lens command apparatus that can detect an absolute position and a relative position accurately can be obtained with a configuration in which a lens command apparatus for driving and operating a lens apparatus including a movable optical member includes the position detection apparatus according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-228844, filed Nov. 11, 2014, which is hereby incorporated by reference herein in its entirety.

What is claimed is:

1. A position detection apparatus for detecting a position of a first member relative to a second member, the apparatus comprising:
   a sensor configured to selectively output a first signal corresponding to a first pattern array having a first period and according to the position and a second signal corresponding to a second pattern array having a second period longer than the first period and according to the position; and
   a processor configured to obtain an initial position based on the output first and second signals, and obtain a displacement amount from the initial position based on the output first signal,
   wherein the processor is configured to obtain, based on the displacement amount, a plurality of ones of the output second signal, and one of the output first signal obtained in this order, an updated value of the displacement amount.

2. The position detection apparatus according to claim 1, wherein
   the sensor is configured to selectively output the first signal and the second signal with switching thereof, and the processor is configured to obtain the plurality of ones of the output second signal without the switching.

3. The position detection apparatus according to claim 1, wherein
   the sensor includes
   the first pattern array and the second pattern array fixed to one of the first member and the second member, and
   a plurality of light receivers fixed to the other of the first member and the second member and configured to receive light reflected by the first and second pattern arrays.

4. The position detection apparatus according to claim 1, wherein
   the sensor includes
   a pattern fixed to one of the first member and the second member,
   a light receiver fixed to the other of the first member and the second member and configured to receive light reflected by the pattern to output, as the second signal, a signal that monotonously increases or decreases in accordance with a change in the position.

5. The position detection apparatus according to claim 1, further comprising:

a counter configured to count a change of a signal obtained by the first signal, wherein the processor is configured to obtain the displacement amount based on a count value obtained by the counter.

6. The position detection apparatus according to claim 1, further comprising:

a switcher configured to output a switching signal to the sensor, wherein the sensor is configured to selectively output the first signal and the second signal in accordance with the switching signal.

7. The position detection apparatus according to claim 1, wherein the processor is configured to obtain the updated value of the displacement amount further based on a time in which the displacement amount, the plurality of ones of the output second signal, and the one of the output first signal are obtained in this order.

8. A lens apparatus comprising:
a movable optical member; and
a position detection apparatus of claim 1 for detecting a position of a first member, as the movable optical member, relative to a second member.

9. An image pickup apparatus comprising:
a lens apparatus comprising:
a movable optical member; and
a position detection apparatus of claim 1 for detecting a position of a first member, as the movable optical member, relative to a second member,
an image pickup element configured to receive light from the lens apparatus.

10. A command apparatus for operating a lens apparatus including a movable optical member, the command apparatus comprising:
a position detection apparatus of claim 1 for detecting a position of a first member, for operating the lens apparatus, relative to a second member.

11. A position detection apparatus for performing detection of a position of a first member relative to a second member, the apparatus comprising:
a sensor including a plurality of pattern arrays respectively having a plurality of periods which are mutually different and configured to selectively output a plurality of displacement signals, respectively corresponding to the plurality of pattern arrays, that change respectively based on the plurality of pattern arrays and based on the position; and
a processor configured to obtain a plurality of relative position signals based on the output plurality of displacement signals, to obtain a first position as the position of the first member relative to the second member based on the plurality of relative position signals, and to obtain a relative position relative to the first position based on a first relative position signal of the plurality of relative position signals,
wherein the processor is configured to obtain, after the relative position is obtained, first and second values as values of a second relative position signal of the plurality of relative position signals, a third value as a value of the first relative position signal in this order, to obtain a second position as a position of the first member relative to the second member based on at least one of the first and second values, and the third value, and to obtain, based on the relative position and the first and second values, an updated value of the relative position, and to perform processing of obtaining the position of the first member relative to the second member based on the second position and the updated value.

12. The position detection apparatus according to claim 11,
wherein a first period of a first pattern array, of the plurality of pattern arrays, corresponding to the first relative position signal is shorter than a second period of a second pattern array, of the plurality of pattern arrays, corresponding to the second relative position signal.

13. The position detection apparatus according to claim 11,
wherein a first period of a first pattern array, of the plurality of pattern arrays, corresponding to the first relative position signal is the shortest of a plurality of periods of the plurality of pattern arrays.

14. The position detection apparatus according to claim 11,
wherein a second period of a second pattern array, of the plurality of pattern arrays, corresponding to the second relative position signal is the longest of a plurality of periods of the plurality of pattern arrays.

15. The position detection apparatus according to claim 11, wherein
the sensor includes
the plurality of pattern arrays arranged with one of the first member and the second member, and
a light receiver arranged with the other of the first member and the second member and configured to receive light reflected by the plurality of pattern arrays.

16. The position detection apparatus according to claim 11, wherein
the sensor includes
a pattern arranged with one of the first member and the second member,
a light receiver arranged with the other of the first member and the second member and configured to receive light reflected by the pattern to output, as the second relative position signal, a signal that monotonously increases or decreases in accordance with a change in the position.

17. The position detection apparatus according to claim 11, further comprising:
a counter configured to perform count based on one of the plurality of displacement signals,
wherein the processor is configured to obtain the relative position based on the count.

18. The position detection apparatus according to claim 11, further comprising:
a switcher configured to output a switching signal to the sensor,
wherein the sensor is configured to selectively output the plurality of displacement signals in accordance with the switching signal.

19. The position detection apparatus according to claim 11,
wherein the processor is configured to obtain the updated value further based on a time in which the relative position, the first and second values, the third value are obtained in this order.

20. The position detection apparatus according to claim 11, wherein the processor is configured to detect abnormality of the detection based on the second position and the updated value.

21. A lens apparatus comprising:
a movable optical member; and
a position detection apparatus of claim 11 for detecting a position of a first member, as the movable optical member, relative to a second member.

22. An image pickup apparatus comprising:
a lens apparatus comprising:
a movable optical member; and
a position detection apparatus of claim 11 for detecting a position of a first member, as the movable optical member, relative to a second member; and
an image pickup element configured to receive light from the lens apparatus.

23. A command apparatus for operating a lens apparatus including a movable optical member, the command apparatus comprising:
a position detection apparatus of claim 11 for detecting a position of a first member, for operating the lens apparatus, relative to a second member.

24. A position detection apparatus for performing detection of a position of a first member relative to a second member, the apparatus comprising:
a sensor including a plurality of pattern arrays respectively having a plurality of periods which are mutually different and configured to selectively output a plurality of displacement signals, respectively corresponding to the plurality of pattern arrays, that change respectively based on the plurality of pattern arrays and based on the position;
a counter; and
a processor configured to obtain a plurality of relative position signals based on the output plurality of displacement signals, to obtain a first position as the position of the first member relative to the second member based on the plurality of relative position signals, and to obtain a relative position relative to the first position based on a first relative position signal of the plurality of relative position signals,
wherein the processor is configured to cause the counter to perform count based on a displacement signal, for obtaining the first relative position signal, of the plurality of displacement signals, and to obtain the relative position based on the count and the first relative position signal, and
wherein the processor is configured to cause the counter to perform stopping of the count after the relative position is obtained, to obtain first and second values as values of a second relative position signal of the plurality of relative position signals, a third value as a value of the first relative position signal in this order, to obtain a second position as a position of the first member relative to the second member based on at least one of the first and second values, and the third value, and to obtain, based on a count updated based on a count of the counter at the stopping and the first and second values, and based on the third value, an updated value of the relative position, to cause the counter to start the count, and to perform processing of obtaining the position of the first member relative to the second member based on the second position and the updated value.

25. The position detection apparatus according to claim 24, wherein a first period of a first pattern array, of the plurality of pattern arrays, corresponding to the first relative position signal is shorter than a second period of a second pattern array, of the plurality of pattern arrays, corresponding to the second relative position signal.

26. The position detection apparatus according to claim 24, wherein a first period of a first pattern array, of the plurality of pattern arrays, corresponding to the first relative position signal is the shortest of a plurality of periods of the plurality of pattern arrays.

27. The position detection apparatus according to claim 24, wherein a second period of a second pattern array, of the plurality of pattern arrays, corresponding to the second relative position signal is the longest of a plurality of periods of the plurality of pattern arrays.

28. The position detection apparatus according to claim 24, wherein
the sensor includes
the plurality of pattern arrays arranged with one of the first member and the second member, and
a light receiver arranged with the other of the first member and the second member and configured to receive light reflected by the plurality of pattern arrays.

29. The position detection apparatus according to claim 24, wherein
the sensor includes
a pattern arranged with one of the first member and the second member,
a light receiver arranged with the other of the first member and the second member and configured to receive light reflected by the pattern to output, as the second relative position signal, a signal that monotonously increases or decreases in accordance with a change in the position.

30. The position detection apparatus according to claim 24, further comprising: a switcher configured to output a switching signal to the sensor, wherein the sensor is configured to selectively output the plurality of displacement signals in accordance with the switching signal.

31. The position detection apparatus according to claim 24, wherein the processor is configured to obtain the updated value further based on a time in which the relative position, the first and second values, the third value are obtained in this order.

32. The position detection apparatus according to claim 24, wherein the processor is configured to detect abnormality of the detection based on the second position and the updated value.

33. A lens apparatus comprising:
a movable optical member; and
a position detection apparatus of claim 24 for detecting a position of a first member, as the movable optical member, relative to a second member.

34. An image pickup apparatus comprising:
a lens apparatus comprising:
a movable optical member; and
a position detection apparatus of claim 24 for detecting a position of a first member, as the movable optical member, relative to a second member; and an image pickup element configured to receive light from the lens apparatus.

35. A command apparatus for operating a lens apparatus including a movable optical member, the command apparatus comprising:
a position detection apparatus of claim 24 for detecting a position of a first member, for operating the lens apparatus, relative to a second member.

* * * * *